US012776861B2

(12) United States Patent
Elshafie et al.

(10) Patent No.: US 12,776,861 B2
(45) Date of Patent: Oct. 27, 2026

(54) WITHIN SLOT REPETITION FOR IMPROVED COVERAGE, ENERGY HARVESTING, AND/OR AUTOMATIC GAIN CONTROL

(71) Applicant: QUALCOMM Incorporated, San Diego, CA (US)

(72) Inventors: Ahmed Elshafie, San Diego, CA (US); Ahmed Attia Abotabl, San Diego, CA (US); Alexandros Manolakos, Athens (GR)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 18/689,956

(22) PCT Filed: Oct. 21, 2022

(86) PCT No.: PCT/US2022/078516
§ 371 (c)(1),
(2) Date: Mar. 7, 2024

(87) PCT Pub. No.: WO2023/076843
PCT Pub. Date: May 4, 2023

(65) Prior Publication Data

US 2025/0096939 A1 Mar. 20, 2025

(30) Foreign Application Priority Data

Nov. 1, 2021 (GR) .............................. 20210100758

(51) Int. Cl.
*H04L 1/08* (2006.01)
*H04W 72/232* (2023.01)
*H04W 72/25* (2023.01)

(52) U.S. Cl.
CPC ............ *H04L 1/08* (2013.01); *H04W 72/232* (2023.01); *H04W 72/25* (2023.01)

(58) Field of Classification Search
CPC ...... H04W 72/232; H04W 72/25; H04L 1/08; H04L 1/1864; H04L 1/1893; H04L 1/1896
See application file for complete search history.

(56) References Cited

U.S. PATENT DOCUMENTS

2005/0276313 A1* 12/2005 Horneman ........... H04B 1/7105 375/E1.032
2020/0275458 A1* 8/2020 Khoryaev ............. H04W 72/25
(Continued)

FOREIGN PATENT DOCUMENTS

WO WO-2018175528 A1 9/2018
WO WO-2020186440 A1 9/2020

OTHER PUBLICATIONS

International Search Report and Written Opinion—PCT/US2022/078516—ISA/EPO—Feb. 6, 2023.

*Primary Examiner* — Kashif Siddiqui
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of a quantity of a first set of symbols for a slot. The UE may receive data in the first set of symbols and a second set of symbols in the slot, wherein the first set of symbols repeat data included in one or more symbols of the second set of symbols. Numerous other aspects are described.

27 Claims, 10 Drawing Sheets

(56) References Cited

U.S. PATENT DOCUMENTS

| | | | | |
|---|---|---|---|---|
| 2022/0141779 | A1* | 5/2022 | Ren | H04L 1/08<br>455/522 |
| 2022/0352751 | A1* | 11/2022 | Elshafie | H02J 50/23 |
| 2023/0396362 | A1* | 12/2023 | Shin | H04L 1/0057 |

* cited by examiner

WITHIN SLOT REPETITION FOR IMPROVED COVERAGE, ENERGY HARVESTING, AND/OR AUTOMATIC GAIN CONTROL

CROSS-REFERENCE TO RELATED APPLICATIONS

This Patent Application is a 371 national stage of PCT Application No. PCT/US2022/078516, filed on Oct. 21, 2022, entitled "WITHIN SLOT REPETITION FOR IMPROVED COVERAGE, ENERGY HARVESTING, AND/OR AUTOMATIC GAIN CONTROL," which claims priority to Greek Nonprovisional patent application No. 20210100758, filed on Nov. 1, 2021, entitled "WITHIN SLOT REPETITION FOR IMPROVED COVERAGE, ENERGY HARVESTING, AND/OR AUTOMATIC GAIN CONTROL," which are hereby expressly incorporated by reference herein.

FIELD OF THE DISCLOSURE

Aspects of the present disclosure generally relate to wireless communication and to techniques and apparatuses for within slot repetition for improved coverage, energy harvesting, and/or automatic gain control (AGC).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to receive an indication of a quantity of a first set of symbols for a slot. The one or more processors may be configured to receive data in the first set of symbols and a second set of symbols in the slot, wherein the first set of symbols repeat data included in one or more symbols of the second set of symbols.

Some aspects described herein relate to a method of wireless communication performed by a UE. The method may include receiving an indication of a quantity of a first set of symbols for a slot. The method may include receiving data in the first set of symbols and a second set of symbols in the slot, wherein the first set of symbols repeat data included in one or more symbols of the second set of symbols.

Some aspects described herein relate to a non-transitory computer-readable medium that stores a set of instructions for wireless communication by a UE. The set of instructions, when executed by one or more processors of the UE, may cause the UE to receive an indication of a quantity of a first set of symbols for a slot. The set of instructions, when executed by one or more processors of the UE, may cause the UE to receive data in the first set of symbols and a second set of symbols in the slot, wherein the first set of symbols repeat data included in one or more symbols of the second set of symbols.

Some aspects described herein relate to an apparatus for wireless communication. The apparatus may include means for receiving an indication of a quantity of a first set of symbols for a slot. The apparatus may include means for receiving data in the first set of symbols and a second set of symbols in the slot, wherein the first set of symbols repeat data included in one or more symbols of the second set of symbols.

Some aspects described herein relate to a first UE for wireless communication. The first user equipment may include a memory and one or more processors coupled to the memory. The one or more processors may be configured to transmit, to a second UE, an indication of a quantity of a first set of symbols for a slot. The one or more processors may be configured to transmit, to the second UE, data in the first set of symbols and a second set of symbols in the slot, wherein the first set of symbols repeat data included in one or more symbols of the second set of symbols.

Some aspects described herein relate to a base station for wireless communication. The base station may include a memory and one or more processors coupled to the memory. The one or more processors may be configured to transmit, to a UE, an indication of a quantity of a first set of symbols for a slot. The one or more processors may be configured to transmit, to the UE, data in the first set of symbols and a second set of symbols in the slot, wherein the first set of symbols repeat data included in one or more symbols of the second set of symbols.

Some aspects described herein relate to a method of wireless communication performed by a first UE. The method may include transmitting, to a second UE, an indication of a quantity of a first set of symbols for a slot. The method may include transmitting, to the second UE, data in the first set of symbols and a second set of symbols in the slot, wherein the first set of symbols repeat data included in one or more symbols of the second set of symbols.

Some aspects described herein relate to a method of wireless communication performed by a base station. The method may include transmitting, to a UE, an indication of a quantity of a first set of symbols for a slot. The method may include transmitting, to the UE, data in the first set of symbols and a second set of symbols in the slot, wherein the first set of symbols repeat data included in one or more symbols of the second set of symbols.

Some aspects described herein relate to a non-transitory computer-readable medium that stores a set of instructions for wireless communication by a first UE. The set of instructions, when executed by one or more processors of the UE, may cause the UE to transmit, to a second UE, an indication of a quantity of a first set of symbols for a slot. The set of instructions, when executed by one or more processors of the UE, may cause the UE to transmit, to the second UE, data in the first set of symbols and a second set of symbols in the slot, wherein the first set of symbols repeat data included in one or more symbols of the second set of symbols.

Some aspects described herein relate to a non-transitory computer-readable medium that stores a set of instructions for wireless communication by a base station. The set of instructions, when executed by one or more processors of the base station, may cause the base station to transmit, to a UE, an indication of a quantity of a first set of symbols for a slot. The set of instructions, when executed by one or more processors of the base station, may cause the base station to transmit, to the UE, data in the first set of symbols and a second set of symbols in the slot, wherein the first set of symbols repeat data included in one or more symbols of the second set of symbols.

Some aspects described herein relate to an apparatus for wireless communication. The apparatus may include means for transmitting, to a UE, an indication of a quantity of a first set of symbols for a slot. The apparatus may include means for transmitting, to the UE, data in the first set of symbols and a second set of symbols in the slot, wherein the first set of symbols repeat data included in one or more symbols of the second set of symbols.

Some aspects described herein relate to an apparatus for wireless communication. The apparatus may include means for transmitting, to a UE, an indication of a quantity of a first set of symbols for a slot. The apparatus may include means for transmitting, to the UE, data in the first set of symbols and a second set of symbols in the slot, wherein the first set of symbols repeat data included in one or more symbols of the second set of symbols.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
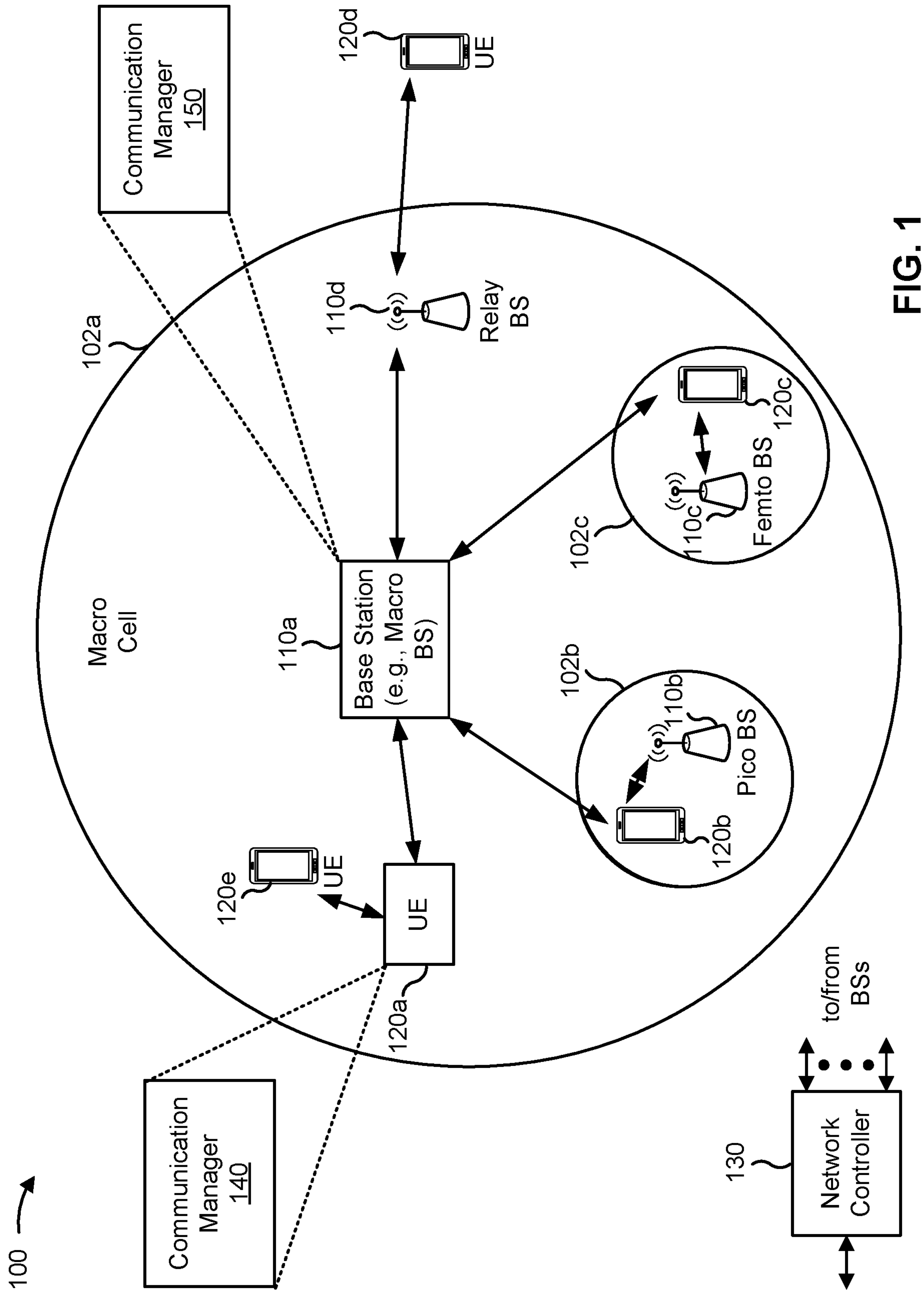
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHz, FR1 is often referred to (interchangeably) as a “Sub-6 GHz” band in various documents and articles. A similar nomenclature issue sometimes occurs with regard to FR2, which is often referred to (interchangeably) as a “millimeter wave” band in documents and articles, despite being different from the extremely high frequency (EHF) band (30 GHz-300 GHz) which is identified by the International Telecommunications Union (ITU) as a “millimeter wave” band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term “sub-6 GHz” or the like, if used herein, may broadly represent frequencies that may be less than 6 GHz, may be within FR1, or may include mid-band frequencies. Further, unless specifically stated otherwise, it should be understood that the term “millimeter wave” or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an indication of a quantity of a first set of symbols for a slot; and receive data in the first set of symbols and a second set of symbols in the slot, wherein the first set of symbols repeat data included in one or more symbols of the second set of symbols. Additionally, or alternatively, the communication manager 140 may perform one or more other operations described herein.

In some aspects, as described in more detail elsewhere herein, the communication manager 140 may transmit, to a second UE, an indication of a quantity of a first set of symbols for a slot; and transmit, to the second UE, data in the first set of symbols and a second set of symbols in the slot, wherein the first set of symbols repeat data included in one or more symbols of the second set of symbols. Additionally, or alternatively, the communication manager 140 may perform one or more other operations described herein.

In some aspects, the base station 110 may include a communication manager 150. As described in more detail elsewhere herein, the communication manager 150 may transmit, to a UE, an indication of a quantity of a first set of symbols for a slot; and transmit, to the UE, data in the first set of symbols and a second set of symbols in the slot, wherein the first set of symbols repeat data included in one or more symbols of the second set of symbols. Additionally, or alternatively, the communication manager 150 may perform one or more other operations described herein.

As indicated above, FIG. 1 is provided as an example. Other examples may differ from what is described with regard to FIG. 1.

Figure 2:
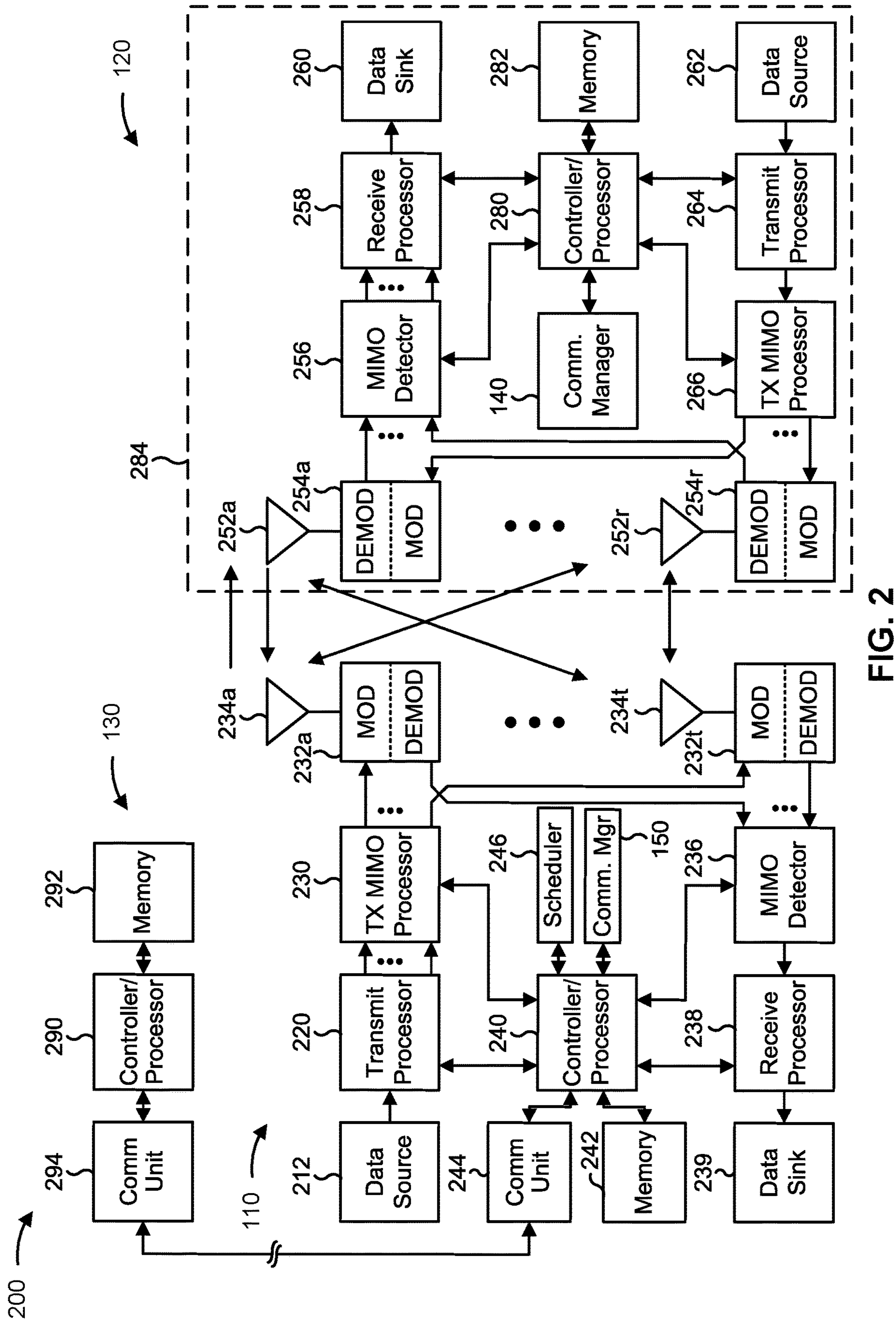
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the base station 110, the controller/processor 280 of the UE 120, and/or any other component(s) of FIG. 2 may perform one or more techniques associated with within slot repetition for improved coverage, energy harvesting, and/or automatic gain control (AGC), as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving an indication of a quantity of a first set of symbols for a slot; and/or means for receiving data in the first set of symbols and a second set of symbols in the slot, wherein the first set of symbols repeat data included in one or more symbols of the second set of symbols. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for transmitting, to a second UE, an indication of a quantity of a first set of symbols for a slot; and/or means for transmitting, to the second UE, data in the first set of symbols and a second set of symbols in the slot, wherein the first set of symbols repeat data included in one or more symbols of the second set of symbols. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a UE, an indication of a quantity of a first set of symbols for a slot; and/or means for transmitting, to a UE, data in the first set of symbols and a second set of symbols in the slot, wherein the first set of symbols repeat data included in one or more symbols of the second set of symbols. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
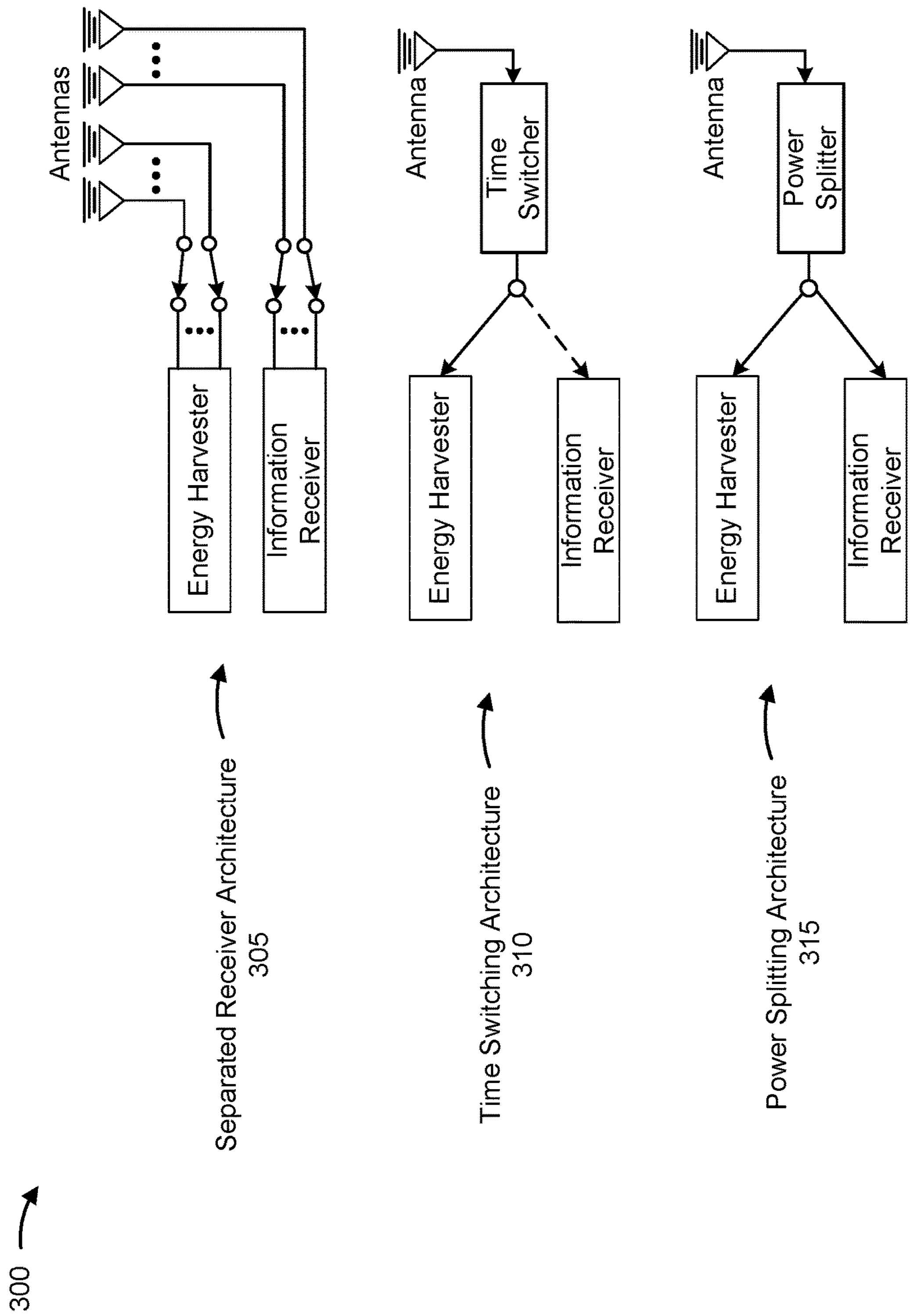
FIG. 3 is a diagram illustrating examples of radio frequency energy harvesting, in accordance with the present disclosure.

FIG. 3 is a diagram illustrating examples 300 of radio frequency (RF) energy harvesting, in accordance with the present disclosure. As shown in FIG. 3, an RF receiver (e.g., a UE 120) may receive signals (e.g., radio signals carried on radio waves) from an RF transmitter (e.g., a base station 110 or a UE 120) and convert electromagnetic energy of the signals (e.g., using a rectenna comprising a dipole antenna with an RF diode) into direct current electricity for use by the RF receiver.

As shown by reference number 305, in some aspects, the RF receiver may use a separated receiver architecture, where a first set of antennas is configured to harvest energy, and a second set of antennas is configured to receive data. In this situation, each set of antennas may be separately configured to receive signals at certain times, frequencies, and/or via one or more particular beams, such that all signals received by the first set of antennas are harvested for energy by an energy harvester (e.g., an energy harvester circuit), and all signals received by the second set of antennas are processed to receive information by an information receiver (e.g., an information receiver/decoder circuit).

As shown by reference number 310, in some aspects, the RF receiver may use a time-switching architecture to harvest energy. The time-switching architecture allows the RF receiver to switch between an energy harvester that harvests energy from received signals and an information receiver that decodes received signals to receive information. The time-switching architecture may use one or more antennas to receive signals, and whether the signals are harvested for energy or processed to receive information depends on the time at which the signals are received. For example, one or more first time slots may be time slots during which received signals are sent to one or more energy harvesting components (e.g., the energy harvester) to harvest energy, and one or more second time slots may be time slots during which received signals are processed and decoded (e.g., by the information receiver) to receive information. In some aspects, the time slots may be pre-configured (e.g., by the RF receiver, the RF transmitter, or another device). The energy harvested at receiver j from source i may be calculated as $E_j=\eta P_i|g_{i-j}|^2\alpha T$, where $0\leq\alpha\leq 1$ is a fraction of a total time period T allocated for energy harvesting, $P_i$ is a transmit power, $|g_{i-j}|^2$ is a channel power gain, and n (e.g., $0\leq\eta\leq 1$) is an energy harvesting efficiency. Letting κ and W denote a noise spectral density and a channel bandwidth, respectively, the data rate for the time-switching architecture may be calculated as $$R_{i-j}=(1-\alpha)\log_2\left(1+\frac{|g_{i-j}|^2P_i}{\kappa W}\right).$$

As shown by reference number 315, in some aspects, the RF receiver may use a power-splitting architecture to harvest energy. The power-splitting architecture may use one or more antennas to receive signals, and the signals are handled by one or both of the energy harvesting and/or information receiving components according to an energy harvesting rate. The received signals may be split into two streams (e.g., one for the energy harvester and another for the information receiver) with different power levels. For example, the RF receiver may be configured to use a first portion of received signals for energy harvesting and the remaining received signals for information receiving. The energy harvesting rate is dependent on (e.g., a fraction of) power of a received signal that is allocated for energy harvesting. In some aspects, the energy harvesting rate may be pre-configured (e.g., by the RF receiver, the RF transmitter, or another device). The energy harvested at receiver j from source i may be calculated as $E_j = \eta\rho P_i |g_{i-j}|^2 T$, where $0 \leq \rho \leq 1$ is the energy harvesting rate (e.g., the fraction of the power allocated for energy harvesting). The data rate for the power-splitting architecture may be calculated as $$R_{i-j} = \log_2\left(1 + \frac{|g_{i-j}|^2(1-\rho)P_i}{\kappa W}\right).$$

Energy harvested by the RF receiver may be used and/or stored for later use. For example, in some aspects, the RF receiver may be powered directly by the harvested energy. In some aspects, the RF receiver may use an energy storage device, such as a battery, capacitor, and/or supercapacitor, to gather and store harvested energy for immediate and/or later use.

As indicated above, FIG. 3 is provided as one or more examples. Other examples may differ from what is described with respect to FIG. 3.

Energy harvesting may be used to prolong the battery life of UEs (e.g., including sidelink UEs, such as wearable devices, among other examples). Furthermore, energy harvesting may be used to provide incentives (e.g., signals for energy harvesting) in exchange for cooperation by UEs, such as relaying signals for other UEs. However, in some cases, energy harvesting may adversely affect a data rate of traffic received by a UE.

Some techniques and apparatuses described herein enable a portion of a downlink (e.g., a physical shared downlink channel (PDSCH)) signal or a portion of a sidelink (e.g., a physical shared sidelink channel (PSSCH)) signal to be repeated within a slot. In some aspects, a UE may receive (e.g., from a base station or another UE) an indication of a quantity of a first set symbols for a slot. The UE may receive data in the first set of symbols and a second set of symbols in the slot. The first set of symbols may include repetition of data included in one or more symbols in the second set of symbols. For example, a transport block may be included in the second set of symbols in the slot, and the first set of symbols may repeat of one or more symbols in the second set of symbols. In some aspects, the UE may perform energy harvesting using the first set of symbols. Because the first set of symbols are repetitions of symbols in the second set of symbols, the UE may perform energy harvesting in the slot, while still receiving the data transmitted in the slot. As a result, the battery life of the UE may be prolonged, without delaying traffic transmitted to the UE. In some aspects, the UE may perform combined decoding of one or more of the symbols in the second set of symbols and the first set of symbols. As a result, the decoding of the symbols may be improved, resulting in improved coverage for the UE. In some aspects, the UE may perform AGC using all or a portion of the first set of symbols, which may result in improved AGC for a sidelink communication.

Figure 4:
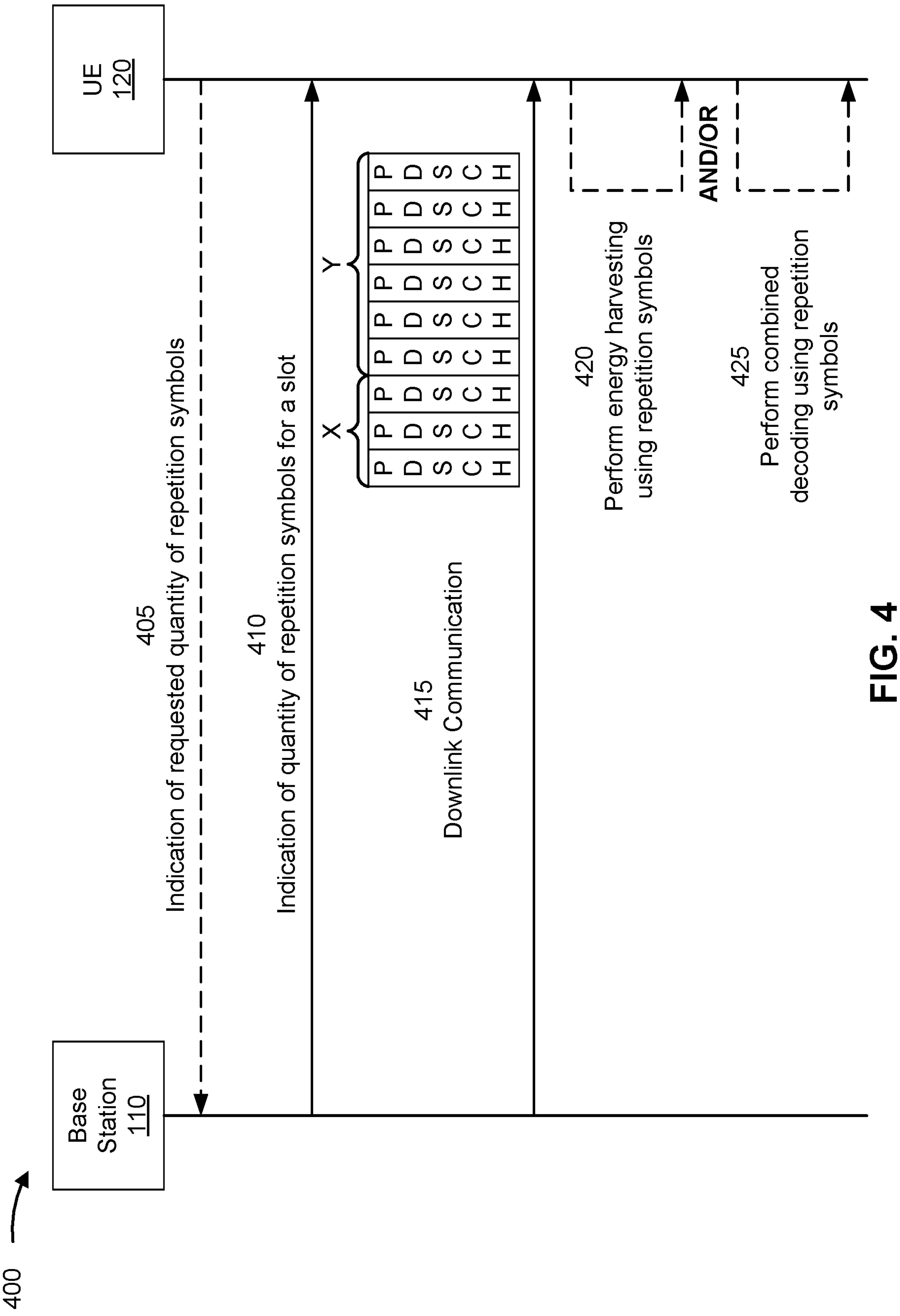
FIGS. 4-5 are diagrams illustrating examples associated with within slot repetition for improved coverage, energy harvesting, and/or automatic gain control (AGC), in accordance with the present disclosure.

FIG. 4 is a diagram illustrating an example 400 associated with within slot repetition for improved coverage, energy harvesting, and/or AGC, in accordance with the present disclosure. As shown in FIG. 4, example 400 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown in FIG. 4, and by reference number 405, in some aspects, the UE 120 may transmit, to the base station 110, an indication of a requested quantity of repetition symbols for a slot. "Repetition symbols" refers to one or more symbols in a slot that are used to transmit repeated data that is also transmitted using one or more of the remaining symbols in the slot. The repetition symbols in a slot may also be referred to as a first set of symbols in the slot, and the remaining symbols in the slot may be referred to as a second set of symbols in the slot. In some aspects, the second set of symbols may be allocated for transmitting a transport block to the UE 120, and the first set of symbols may include repetitions of data signals included in at least a subset of the second set of symbols. In some aspects, the UE 120 may use the repetition symbols in a downlink communication for energy harvesting and/or combined decoding of one or more symbols of the transport block. In some aspects, the UE 120 may use the repetition symbols in a sidelink communication for energy harvesting, combined decoding of one or more symbols of the transport block, and/or AGC.

In some aspects, the UE 120 may transmit, to the base station 110, an indication of a requested or recommended quantity of repetition symbols to be included in a slot. For example, the UE 120 may determine the requested quantity of repetition symbols based at least in part on energy harvesting needs (e.g., a battery life) of the UE 120. In some aspects, the UE 120 may transmit, to the base station 110, a requested or recommended repetition pattern for the repetition symbols. The repetition pattern may indicate which one or more symbols of the second set of symbols are repeated in the first set of symbols (e.g., the repetition symbols). For example, if X denotes the quantity of the first set of symbols (e.g., the repetition symbols) in a slot and Y denotes the quantity of the second set of symbols in a slot, the repetition pattern may indicate X symbols of the Y symbols in the second set of symbols that are repeated in the first set of symbols. As used herein, a symbol in the set of symbols is "repeated" in the first set of symbols if the same data is transmitted on a symbol in the first set of symbols as on the symbol in the second set of symbols.

In some aspects, the UE 120 may provide separate indications of the requested quantity of the repetition symbols and the requested repetition pattern. In some aspects, the indication of the requested repetition pattern may also provide the indication of the requested quantity of the repetition symbols. In some aspects, the UE 120 may be configured with multiple quantity and/or repetition pattern options for the repetition symbols. In this case, the UE 120 may request a quantity and/or repetition pattern option from the configured options, and the UE 120 may transmit, to the base station 110, an indication of the requested quantity and/or repetition option. For example, the indication may include an index value associated with the requested quantity and/or repetition option. In some aspects, the indication of the requested repetition pattern may include a bitmap that indicates the request for which symbols in the second set of symbols are repeated in the first set of symbols. For example, the bitmap may be a bitmap of size Y that indicates X symbols requested to be repeated of the Y symbols in the second set of symbols.

In some aspects, the first set of symbols (e.g., the repetition symbols) are configured to be transmitted in a certain location within a slot. For example, in some aspects, in a downlink communication that includes X repetition symbols, the repetition symbols may be transmitted in the first occurring X PDSCH symbols in the slot. In some aspects, the base station 110 may select a location to transmit the first set of symbols (e.g., the repetition symbols) in a slot. For example, for a downlink communication, the base station 110 may select whether to transmit the repetition symbols in the first X PDSCH symbols of the slot or in the last X PDSCH symbols in the slot. In this case, the UE 120 may transmit, to the base station 110, an indication of a requested or recommended location for the repetition symbols in the slot. For example, the UE 120 may request that the repetition symbols be transmitted at the beginning of the slot (e.g., in the first X symbols), at the end of the slot (e.g., in the last X symbols), or at another location in the slot.

As further shown in FIG. 4, and by reference number 410, the base station 110 may transmit, to the UE 120, an indication of a quantity (X) of repetition symbols for a slot. The base station 110 may select the quantity of repetition symbols (e.g., a quantity of the first set of symbols) to be included in a slot, and the base station 110 may transmit, to the UE 120, an indication of the quantity of repetition symbols to be included in the slot.

In some aspects, the repetition signals (e.g., the first set of symbols) may be configured to be transmitted at a certain location within the slot, such as at the beginning of the slot. For example, for a downlink communication, the first set of symbols (e.g., the repetition symbols) may be the first X PDSCH symbols occurring in the slot, and the first set of symbols may be followed by the second set of symbols, which may include the Y remaining PDSCH symbols in the slot. In some aspects, a default repetition pattern may be configured for the first set of symbols. For example, the X symbols in the first set of symbols may be respective repetitions (e.g., be used to transmit the same data) as the first X symbols of the Y symbols in the second set of symbols. In this case, the indication of X (e.g., the quantity of the first set of symbols) may indicate, to the UE 120, that the first X PDSCH symbols in the slot are the repetition symbols that repeat the first X symbols of the remaining Y PDSCH symbols in the slot.

In some aspects, the indication, transmitted by the base station 110 to the UE 120, may include an indication of the repetition pattern for the first set of symbols. The repetition pattern may indicate which of the second set of symbols are repeated in the first set of symbols. For example, the repetition pattern may indicate X symbols of the Y symbols in the second set of symbols that are repeated in the first set of symbols. In some aspects, the UE 120 may provide separate indications of the quantity of the first set of symbols and the repetition pattern for the first set of symbols. In some aspects, the indication of the repetition pattern for the first set of symbols may provide the indication of the quantity of the first set of symbols. In some aspects, the indication of the repetition pattern may include a bitmap that indicates which symbols in the second set of symbols are repeated in the first set of symbols. For example, the bitmap may be a bitmap of size Y that indicates X symbols to be repeated of the Y symbols in the second set of symbols. In this case, the bitmap may include a respective value for each of the Y symbols of the second set of symbols. A first value (e.g., 0) for a symbol in the second set of symbols may indicate that the symbol is not repeated in the first set of symbols, and a second value (e.g., 1) for a symbol in the second set of symbols may indicate that the symbol is repeated in the first set of symbols. In some aspects, the indication, transmitted by the base station 110, may include an indication of a selected quantity and/or repetition pattern option from a plurality of configured quantity and/or repetition pattern options. For example, the indication may include an index value associated with the selected quantity and/or repetition option.

In some aspects, the base station 110 may select a location of the first set of symbols (e.g., the repetition symbols) in the slot. For example, the base station 110 may select whether the first set of symbols are transmitted at the beginning of the slot (e.g., the first X PDSCH symbols in the slot), at the end of the slot (e.g., the last X PDSCH symbols in the slot), or at another location in the slot. In this case, the base station 110 may transmit, to the UE 120, an indication of the location of the first set of symbols in the slot.

In some aspects, the base station 110 may use zero power channel state information reference signals (ZP-CSI-RSs) to indicate the quantity and/or location of the first set of symbols in the slot. For example, the base station 110 may transmit, to the UE 120, a configuration of a respective ZP-CSI-RS on each of the X symbols in the first set of symbols. In this case, the base station 110 may also provide an indication that activates or enables a within slot PDSCH repetition mode or feature for the UE 120. The UE 120, in connection with the within slot PDSCH repetition mode or feature being enabled/activated, may understand that the ZP-CSI-RSs indicate X repetition symbols that may be used, by the UE 120, for energy harvesting and/or combined decoding.

In some aspects, the quantity X of the first set of symbols (e.g., the repetition symbols) in the slot, the repetition pattern for the first set of symbols, and/or the location of the first set of symbols in the slot may be semi-statically configured, dynamically indicated, or a combination thereof. For example, the base station 110 may transmit, the indication of the quantity X, the repetition pattern, and/or the location of the first set of symbols in the slot in at least one of a radio resource control (RRC) message, a medium access control (MAC) control element (MAC-CE), or downlink control information (DCI) (e.g., included in a physical downlink control channel (PDCCH) communication).

In some aspects, the base station 110 may select the quantity X, the repetition pattern, and/or the location of first set of symbols in the slot based at least in part on the requested quantity, repetition pattern, and/or location in the slot received from the UE 120. For example, the base station 110 may select at least one of the requested quantity, repetition pattern, or location in the slot indicated by the UE 120. In some aspects, the base station 110 may select the quantity X, the repetition pattern, and/or the location of the first set of symbols in the slot without receiving some or all of the requested information from the UE 120 and/or independently from requested information received from the UE 120. For example, the base station 110 may determine the quantity Y of the second set of symbols to transmit a transport block based at least in part on an amount of data to be transmitted to the UE 120, and the base station 110 may select the quantity X of the first set of symbols (e.g., the quantity of repetition symbols) as the remaining quantity of PDSCH symbols in the slot.

As further shown in FIG. 4, and by reference number 415, the base station 110 may transmit, to the UE 120, a downlink communication including the first set of symbols and the second set of symbols in a slot. As shown in FIG. 4, the first set of symbols in the slot may include X symbols (e.g., X=3 in FIG. 4), and the second set of symbols in the slot may include Y symbols (e.g., Y=6 in FIG. 4). The base station 110 may transmit a PDSCH transmission including data to be decoded by the UE 120 in the Y symbols of the second set of symbols, and the X symbols of the first set of symbols may repeat data transmitted in one or more symbols of the second set of symbols. For example, the X symbols of the first set of symbols may repeat the data transmitted in X symbols of the Y symbols of the second set of symbols.

The UE 120 may receive the downlink communication including the first set of symbols and the second set of symbols. In some aspects, the UE 120 may perform rate-matching for PDSCH decoding across the second set of symbols. For example, the UE 120, based at least in part on the indication of the quantity of the first set of symbols received from the base station 110, may compute the transport block size for the downlink communication in the slot based on the Y symbols in the second set of symbols (e.g., and not based on the X symbols in the first set of symbols).

As further shown in FIG. 4, and by reference number 420, in some aspects, the UE 120 may perform energy harvesting using the first set of symbols (e.g., the repetition symbols). In some aspects, based at least in part on receiving the indication of the quantity X of the first set of symbols (e.g., the repetition symbols), the UE 120 may determine whether to perform energy harvesting using the first set of symbols. In some aspects, prior to performing energy harvesting, the UE 120 may determine whether an energy level of the UE 120 satisfies a threshold. Based at least in part on the threshold being satisfied, the UE 120 may determine to perform energy harvesting using the first set of symbols. For example, the UE 120 may have a low battery or may not have enough power to decode and/or transmit a response to the data included in the second set of symbols. In some aspects, the threshold may be preconfigured, for example, at a number between 0% and 100% of available power at the UE.

The UE 120 may perform energy harvesting using all or a portion of the signals received in the first set of symbols. For example, the UE 120 may harvest energy from all or a portion of the signals received in the first set of symbols, and the UE 120 may use and/or store the harvested energy from the signals received in the first set of symbols. In some aspects, the UE 120 may harvest energy from the signals received in all or a subset of the first set of symbols (e.g., using a time-switching architecture, as described elsewhere herein). In some aspects, the UE 120 may harvest energy from all or a portion of the available power in the signals received in the first set of symbols (e.g., using a power-switching architecture, as described elsewhere herein).

As further shown in FIG. 4, and by reference number 425, in some aspects, the UE 120 may perform combined PDSCH decoding of one or more symbols in the second set of symbols using the first set of symbols (e.g., the repetition symbols). For example, the UE 120 may use combined decoding for some or all of the symbols in the second set of symbols that are repeated in the first set of symbols. For a symbol in the second set of symbols that includes a same data signal as a repetition symbol in the first set of symbols, the UE 120 may decode the repetition symbol in the first set of symbols and the symbol in the second set of symbols, and the UE 120 may combine log likelihood ratios (LLRs) resulting from decoding the two symbols to obtain the repeated data included in both symbols. As a result, the UE 120 may improve the reliability of PDSCH decoding, which may result in improved coverage for the UE 120.

In some aspects, the UE 120 may perform the combined decoding using all or a portion of the first set of symbols based at least in part on a determination not to perform energy harvesting using all or a portion of the first set of symbols. For example, the UE 120 may determine to perform combined decoding using the first set of symbols based at least in part on a determination that the energy level of the UE 120 does not satisfy the threshold for energy harvesting (e.g., a determination that energy harvesting is not currently needed by the UE 120).

In some aspects, the UE 120 may use a first portion of the signals received in the first set of symbols for energy harvesting and a second portion of the signals received in the first set of symbols for combined decoding. In some aspects, the UE 120 may harvest energy from the signals received in a first subset of the first set of symbols, and the UE 120 may perform combined decoding using the signals received in a second subset of the first set of symbols (e.g., using a time-switching architecture, as described elsewhere herein). In some aspects, the UE 120 may harvest energy from a first portion of the available power in the signals received in the first set of symbols, and the UE 120 may use a second portion of the available power in the signals received in the first set of symbols for combined decoding with one or more of the second set of symbols (e.g., using a power-switching architecture, as described elsewhere herein).

As indicated above, FIG. 4 is provided as an example. Other examples may differ from what is described with respect to FIG. 4.

Figure 5:
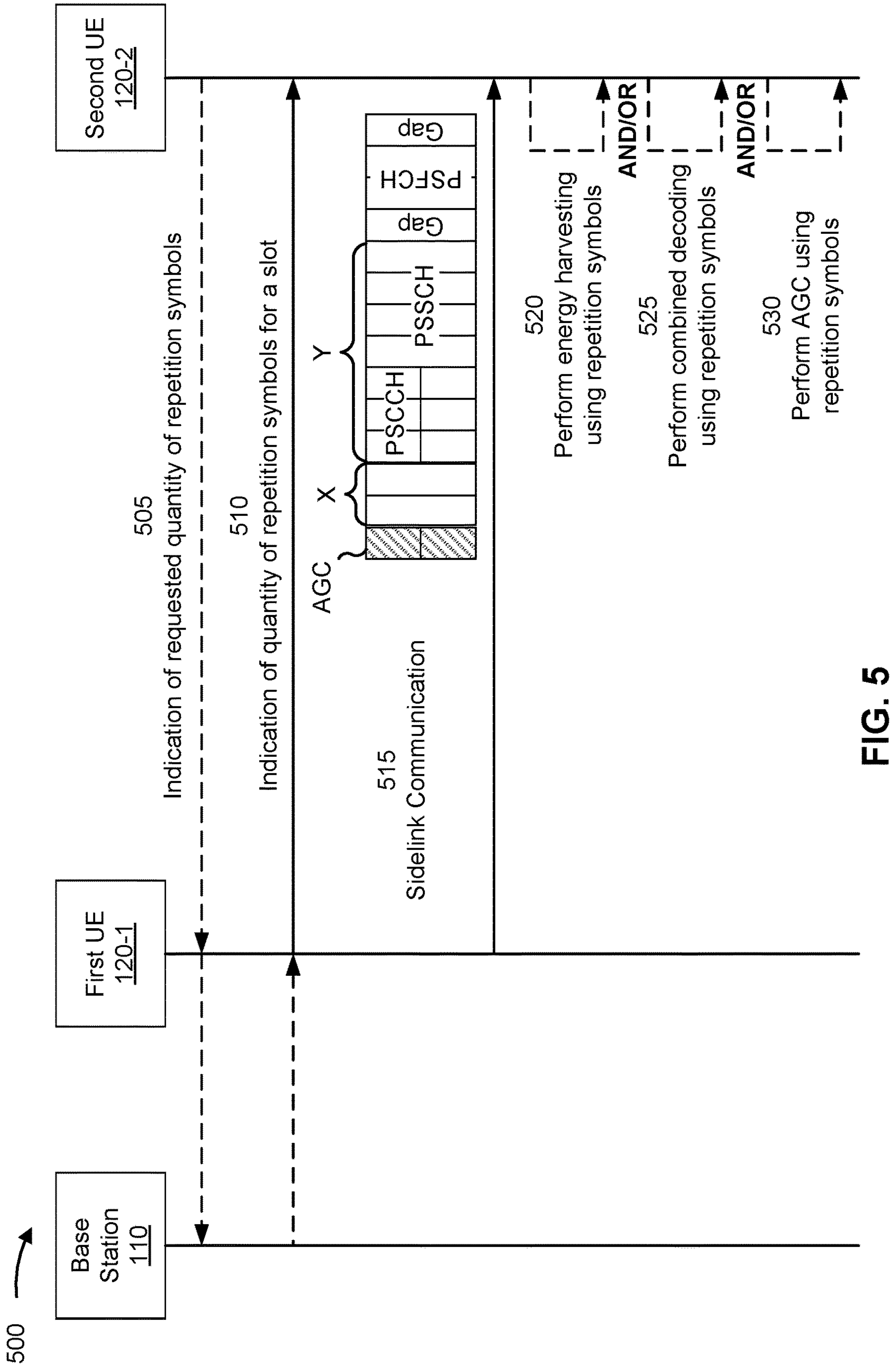

FIG. 5 is a diagram illustrating an example 500 associated with within slot repetition for improved coverage, energy harvesting, and/or AGC, in accordance with the present disclosure. As shown in FIG. 5, example 500 includes communication between a base station 110, a first UE 120-1, and a second UE 120-2. In some aspects, the base station 110, the first UE 120-1, and the second UE 120-2 may be included in a wireless network, such as wireless network 100. The base station 110 may communicate with the first UE 120-1 and/or the second UE 120-2 via a wireless access link, which may include an uplink and a downlink. The first UE 120-1 and the second UE 120-2 may communicate via a sidelink (e.g., via a PC5 interface).

In some aspects, the first UE 120-1 may be a transmitting (Tx) UE for one or more sidelink communications, and the second UE 120-2 may be a receiving (Rx) UE for the one or more sidelink communications. In some aspects, the first UE 120-1 (e.g., Tx UE) and/or the second UE 120-2 (e.g., Rx UE) may operate in a first sidelink resource allocation mode (e.g., Mode 1) in which the base station 110 allocates resources for sidelink communications between the UEs. In some aspects, the first UE 120-1 (e.g., Tx UE) and/or the second UE 120-2 (e.g., Rx UE) may operate using a second sidelink resource allocation mode (e.g., Mode 2) in which resource allocation for sidelink communication is autonomously performed by the Tx UE (e.g., the first UE 120-1).

As shown in FIG. 5, and by reference number 505, in some aspects, the second UE 120-2 may transmit, to the first UE 120-1, an indication of a requested quantity of repetition symbols for a slot. The repetition symbols in a slot may also be referred to as a first set of symbols in the slot, and a second set of symbols in the slot may include all or a portion of the remaining symbols in the slot. For example, for a sidelink communication, the first set of symbols may include a quantity of PSSCH symbols in a slot, and the second set of symbols may include the remaining PSSCH symbols in the slot. In some aspects, the second set of symbols may be allocated for transmitting a transport block to the second UE 120-2, and the first set of symbols may include repetitions of data signals included in at least a subset of the second set of symbols. In some aspects, the second UE 120-2 may use the repetition symbols in a sidelink communication for energy harvesting, combined decoding of one or more symbols of the transport block, and/or AGC.

In some aspects, the second UE 120-2 may transmit, to the first UE 120-1, an indication of a requested or recommended quantity of repetition symbols to be included in a slot. For example, the second UE 120-2 may determine the requested quantity of repetition symbols based at least in part on energy harvesting needs (e.g., a battery life) of the second UE 120-2. In some aspects, the second UE 120-2 may transmit, to the first UE 120-1, a requested or recommended repetition pattern for the repetition symbols. The repetition pattern may indicate which one or more symbols of the second set of symbols are repeated in the first set of symbols (e.g., the repetition symbols). For example, if X denotes the quantity of the first set of symbols (e.g., the repetition symbols) in a slot and Y denotes the quantity of the second set of symbols in a slot, the repetition pattern may indicate X symbols of the Y symbols in the second set of symbols that are repeated in the first set of symbols.

In some aspects, the second UE 120-2 may provide separate indications of the requested quantity of the repetition symbols and the requested repetition pattern. In some aspects, the indication of the requested repetition pattern may also provide the indication requested quantity of the repetition symbols. In some aspects, the base station 110 may configure the first UE 120-1 and the second UE 120-2 (e.g., via configuration messages transmitted from the base station 110) with multiple quantity and/or repetition pattern options for the repetition symbols. In this case, the second UE 120-2 may request a quantity and/or repetition pattern option from the configured options, and the second UE 120-2 may transmit, to the first UE 120-1, an indication of the requested quantity and/or repetition option. For example, the indication may include an index value associated with the requested quantity and/or repetition option. In some aspects, the indication of the requested repetition pattern may include a bitmap that indicates the request for which symbols in the second set of symbols are repeated in the first set of symbols. For example, the bitmap may be a bitmap of size Y that indicates X symbols requested to be repeated of the Y symbols in the second set of symbols.

In some aspects, the first set of symbols (e.g., the repetition symbols) are configured to be transmitted in a certain location within a slot. For example, in some aspects, in a sidelink communication that includes X repetition symbols, the repetition symbols may be transmitted at a beginning of the slot (e.g., in the first occurring X symbols after an AGC symbol in the slot). In some aspects, the first UE 120-1 or the base station 110 may select a location to transmit the first set of symbols (e.g., the repetition symbols) in a slot. For example, for a sidelink communication, the first UE 120-1 or the base station 110 may select whether to transmit the repetition symbols at the beginning of the slot (e.g., in the first occurring X symbols after an AGC symbol in the slot), the end of the slot (e.g., in the last X symbols in the slot), or another location in the slot (e.g., in the last X PSSCH symbols in the slot, prior to the gap symbols and the physical sidelink feedback channel (PSFCH) symbols). In this case, the second UE 120-2 may transmit, to the first UE 120-1, an indication of a requested or recommended location for the repetition symbols in the slot. For example, the second UE 120-2 may request that the repetition symbols be transmitted at the beginning of the slot (e.g., in the first X symbols after the AGC symbol) in a case in which the second UE 120-2 may use one or more of the repetition symbols for performing AGC, and the second UE 120-2 may request that the repetition symbols be transmitted at the end of the slot (e.g., in the last X symbols), or at another location in the slot (e.g., in the last X PSSCH symbols) in a case in which the second UE 120-2 will not use the repetition signals for performing AGC.

In some aspects, such as in a case in which the first UE 120-1 is operating in Mode 1, the first UE 120-1 may transmit, to the base station 110, the indication of the requested quantity of repetition symbols, the requested repetition pattern, and/or the requested location of the repetition symbols received from the second UE 120-2. In some aspects, in a case in which the second UE 120-2 is in a coverage area of the base station 110, the second UE 120-2 may transmit the indication of the requested quantity, repetition pattern, and/or location of the repetition symbols to the base station 110, in addition to, or instead of, to the first UE 120-1.

As further shown in FIG. 5, and by reference number 510, the first UE 120-1 may transmit, to the second UE 120-2, an indication of a quantity (X) of repetition symbols for a slot.

In some aspects, the repetition signals (e.g., the first set of symbols) may be configured to be transmitted at a certain location within the slot, such as at the beginning of the slot. For example, for a sidelink communication, the first set of symbols (e.g., the repetition symbols) may be the first X symbols (e.g., PSSCH symbols) after the AGC symbol in the slot, and the first set of symbols may be followed by the second set of symbols, which may include the Y remaining PSSCH symbols in the slot (e.g., including a subset of symbols that include PSSCH resources and physical sidelink control channel (PSCCH) resources). In some aspects, a default repetition pattern may be configured for the first set of symbols. For example, the X symbols in the first set of symbols may be respective repetitions (e.g., used to transmit the same data) as the first X symbols of the Y symbols in the second set of symbols.

In some aspects, the indication, transmitted by the first UE 120-1 to the second UE 120-2, may include an indication of the repetition pattern for the first set of symbols. The repetition pattern may indicate which of the second set of symbols are repeated in the first set of symbols. For example, the repetition pattern may indicate X symbols of the Y symbols in the second set of symbols that are repeated in the first set of symbols. In some aspects, the repetition pattern may indicate that one or more symbols in the second set of symbols are repeated multiple times in the first set of symbols, which may allow the second UE 120-2 to use the repetitions of the same signal in the first set of symbols for performing AGC. In some aspects, the repetition pattern may indicate that the AGC symbol is repeated in the first set of symbols. In some aspects, the UE 120 may provide separate indications of the quantity of the first set of symbols and the repetition pattern for the first set of symbols. In some aspects, the indication of the repetition pattern for the first set of symbols may provide the indication of the quantity of the first set of symbols.

In some aspects, the base station 110 may configure the first UE 120-1 and the second UE 120-2 (e.g., via configuration messages transmitted from the base station 110) with multiple quantity and/or repetition pattern options for the repetition symbols. In this case, the first UE 120-1 may select a quantity and/or repetition option from the multiple configured quantity and repetition pattern options, and the first UE 120-1 may transmit, to the second UE 120-2, an indication of the selected quantity and repetition option. For example, the indication may include an index value associated with the selected quantity and/or repetition option.

In some aspects, the indication of the repetition pattern may include a bitmap that indicates which symbols in the second set of symbols are repeated in the first set of symbols. For example, the bitmap may be a bitmap of size Y that indicates X symbols to be repeated of the Y symbols in the second set of symbols. In this case, the bitmap may include a respective value for each of the Y symbols of the second set of symbols. A first value (e.g., 0) for a symbol in the second set of symbols may indicate that the symbol is not repeated in the first set of symbols, and a second value (e.g., 1) for a symbol in the second set of symbols may indicate that the symbol is repeated in the first set of symbols.

In some aspects, the indication, transmitted from the first UE 120-1 to the second UE 120-2, may indicate a location of the first set of symbols (e.g., the repetition symbols) in the slot. For example, the first UE 120-1 may indicate, to the second UE 120-2, whether the first set of symbols are transmitted at the beginning of the slot (e.g., the first X symbols in the slot after the AGC symbol), at the end of the slot (e.g., the last X symbols in the slot), or at another location in the slot (e.g., the last X PSSCH symbols in the slot).

In some aspects, the first UE 120-1 may transmit the indication of the quantity X of the first set of symbols (e.g., the repetition symbols) in the slot, the repetition pattern, and/or the location of the first set of symbols in the slot to the second UE 120-2 in at least one of a PC5 RRC message, a PC5 MAC-CE, or a dedicated PSSCH communication. In some aspects, the first UE 120-1 may transmit the indication of the quantity X, the repetition pattern, and/or the location of the first set of symbols in the slot to the second UE 120-2 in sidelink control information (SCI). For example, the first UE 120-1 may transmit the indication in first stage SCI (SCI-1) (e.g., included in a PSCCH communication) or in second stage SCI (SCI-2) (e.g., included in a PSSCH communication). In some aspects, the first UE 120-1 may transmit the indication using a new SCI format, in which SCI-2 may be included in a repetition PSSCH symbol in the first set of symbols (e.g., a first repetition symbol in the first set of symbols). In this case, the SCI included in the repetition symbol (e.g., the first repetition symbol in the slot) may include the indication of the quantity X of repetition symbols and/or the repetition pattern for the repetition symbols.

In some aspects, the first UE 120-1 may transmit, in a slot, a sequential indication of the quantity X, the repetition pattern, and/or the location of the repetition signals for a next slot and/or one or more upcoming slots. For example, in some aspects, the first UE 120-1 may transmit SCI (e.g., SCI-1 or SCI-2) in slot n that indicates the quantity X and/or the repetition pattern for slot n+1. In some aspects, the first UE 120-1 may transmit SCI (e.g., SCI-1 or SCI-2) in slot n that indicates the quantity X and/or the repetition pattern for a set of slots (or transmissions) from slot n+1 to slot n+Z. For example, the SCI in slot n may indicate a quantity X and/or repetition pattern that applies for all of the slots/transmissions in the set of slots/transmissions, or the SCI in slot n may indicate a respective quantity X and/or repetition pattern for each slot/transmission in the set of slots/transmissions. In some aspects, the first UE 120-1 may transmit an indication of Z (e.g., a number of upcoming slots or transmissions for which the current slot can provide the indication) to the second UE 120-2 in a PC5 RRC message, a PC5 MAC-CE, or SCI. In some aspects, the base station 110 may transmit an indication of Z to the first UE 120-1 and/or the second UE 120-2 in an RRC message, a MAC-CE, or DCI.

In some aspects, such as in the case of Mode 2 operation, the first UE 120-1 may select the quantity X of the first set of symbols (e.g., the repetition symbols) in a slot, the repetition pattern for the first set of symbols (e.g., from a plurality of configured quantity and repetition pattern options), and/or the location of the first set of symbols in the slot. In some aspects, the first UE 120-1 may select the quantity X, the repetition pattern, and/or the location of the first set of symbols in a slot based at least in part on information received from the second UE 120-2, such as the requested quantity, repetition pattern, and/or location in the slot. In some aspects, the first UE 120-1 may select the quantity X, the repetition pattern, and/or the location of the first set of symbols in the slot without receiving the information from the second UE 120-2, and/or independently from the information received from the second UE 120-2. For example, the first UE 120-1 may determine the quantity Y of the second set of symbols to use to transmit a PSSCH transport block based at least in part on an amount of data to be transmitted in a PSSCH communication to second UE 120-2, and the first UE 120-1 may select the quantity X of the first set of symbols (e.g., the quantity of repetition symbols) as the remaining quantity of PSSCH symbols in the slot.

In some aspects, such as in a case of Mode 1 operation, the base station 110 may select the quantity X, the repetition pattern, and/or the location of first set of symbols in the slot for a sidelink communication from the first UE 120-1 to the second UE 120-2. In this case, the base station 110 may transmit an indication of the quantity X, the repetition pattern, and/or the location in the slot to the first UE 120-1 (e.g., in DCI), and the first UE 120-1 may transmit an indication of the quantity X, the repetition pattern, and/or the location in the slot to the second UE 120-2 (e.g., in SCI, a PC5 RRC message, a PC5 MAC-CE, and/or a dedicated PSSCH communication). In some aspects, the base station 110 may select the quantity X, the repetition pattern, and/or the location of the first set of symbols in the slot for the sidelink communication based at least in part on information received from the second UE 120-2 (e.g., directly or via the first UE 120-1), such as the requested quantity, repetition pattern, and/or location in the slot. In some aspects, the base station 110 may select the quantity X, the repetition pattern, and/or the location of the first set of symbols in the slot for the sidelink communication without receiving the information from the second UE 120-2, and/or independently from the information received from the second UE 120-2.

As further shown in FIG. 5, and by reference number 515, the first UE 120-1 may transmit, to the second UE 120-2, a sidelink communication including the first set of symbols and the second set of symbols in a slot. As shown in FIG. 5, the first set of symbols in the slot may include X symbols (e.g., X=2 in FIG. 5), and the second set of symbols in the slot may include Y symbols (e.g., Y=7 in FIG. 5). The first UE 120-1 may transmit a PSSCH transmission including data to be decoded by the second UE 120-2 in the Y symbols of the second set of symbols, and the X symbols of the first set of symbols may repeat data transmitted in one or more symbols of the second set of symbols. For example, the X symbols of the first set of symbols may repeat the data transmitted in X symbols of the Y symbols of the second set of symbols. In some aspects, at least one symbol of the first set of symbols may repeat the AGC symbol.

The second UE 120-2 may receive the downlink communication including the first set of symbols and the second set of symbols. In some aspects, the second UE 120-2 may perform rate-matching for PSSCH decoding across the second set of symbols. For example, the second UE 120-2, based at least in part on the indication of the quantity of the first set of symbols received from the first UE 120-1, may compute the transport block size for the sidelink communication (e.g., PSSCH communication) in the slot based on the Y symbols in the second set of symbols (e.g., and not based on the X symbols in the first set of symbols).

As further shown in FIG. 5, and by reference number 520, in some aspects, the second UE 120-2 may perform energy harvesting using the first set of symbols (e.g., the repetition symbols). In some aspects, based at least in part on receiving the indication of the quantity X of the first set of symbols (e.g., the repetition symbols), the second UE 120-2 may determine whether to perform energy harvesting using the first set of symbols. In some aspects, prior to performing energy harvesting, the second UE 120-2 may determine whether an energy level of the second UE 120-2 satisfies a threshold. Based at least in part on the threshold being satisfied, the second UE 120-2 may determine to perform energy harvesting using the first set of symbols. For example, the second UE 120-2 may have a low battery or may not have enough power to decode and/or transmit a response to the data included in the second set of symbols. In some aspects, the threshold may be preconfigured, for example, at a number between 0% and 100% of available power at the second UE 120-2.

The second UE 120-2 may perform energy harvesting using all or a portion of the signals received in the first set of symbols. For example, the second UE 120-2 may harvest energy from all or a portion of the signals received in the first set of symbols, and the second UE 120-2 may use and/or store the harvested energy from the signals received in the first set of symbols. In some aspects, the second UE 120-2 may harvest energy from the signals received in all or a subset of the first set of symbols (e.g., using a time-switching architecture, as described elsewhere herein). In some aspects, the second UE 120-2 may harvest energy from all or a portion of the available power in the signals received in the first set of symbols (e.g., using a power-switching architecture, as described elsewhere herein).

As further shown in FIG. 5, and by reference number 525, in some aspects, the second UE 120-2 may perform combined PSSCH decoding of one or more symbols in the second set of symbols using the first set of symbols (e.g., the repetition symbols). For example, the second UE 120-2 may use combined decoding for some or all of the symbols in the second set of symbols that are repeated in the first set of symbols. For a symbol in the second set of symbols that includes a same data signal as a repetition symbol in the first set of symbols, the second UE 120-2 may decode the repetition symbol in the first set of symbols and the symbol in the second set of symbols, and the second UE 120-2 may combine LLRs resulting from decoding the two symbols to obtain the repeated data included in both symbols. As a result, the second UE 120-2 may improve the reliability of PSSCH decoding.

In some aspects, the second UE 120-2 may perform the combined decoding using all or a portion of the first set of symbols. For example, the second UE 120-2 may use a first portion of the first set of symbols to perform combined decoding, and use a second portion of the first set of symbols to perform energy harvesting and/or AGC. In some aspects, the second UE 120-2 may perform the combined decoding using all or a portion of the first set of symbols based at least in part on a determination not to perform energy harvesting using all or a portion of the first set of symbols. For example, the second UE 120-2 may determine to perform combined decoding using the first set of symbols based at least in part on a determination that the energy level of the second UE 120-2 does not satisfy the threshold for energy harvesting (e.g., a determination that energy harvesting is not currently needed by the second UE 120-2).

As further shown in FIG. 5, and by reference number 530, the second UE 120-2 may perform AGC using all or a portion of the first set of symbols (e.g., the repetition symbols). For example, the second UE 120-2 may perform AGC using one or more symbols of the first set of symbols, in addition to the AGC performed using the AGC symbol in the slot. In this case, using additional signals for AGC may result in improved AGC for the second UE 120-2, which may increase reliability of sidelink reception by the second UE 120-2. In some aspects, the second UE 120-2 may use one or more of the symbols in the first set of symbols for AGC, and the second UE 120-2 may use the remaining symbols in the first set of symbols for energy harvesting and/or combined PSSCH decoding.

In some aspects, the second UE 120-2 may perform AGC using all or a portion of the first set of symbols based at least in part on a determination not to perform energy harvesting using all or a portion of the first set of symbols. For example, the second UE 120-2 may determine to perform AGC using one or more symbols of the first set of symbols based at least in part on a determination that the energy level of the second UE 120-2 does not satisfy the threshold for energy harvesting (e.g., a determination that energy harvesting is not currently needed by the second UE 120-2).

In some aspects, the second UE 120-2 may use a first portion of the signals received in the first set of symbols for energy harvesting and a second portion of the signals received in the first set of symbols for combined decoding and/or AGC. In some aspects, the second UE 120-2 may harvest energy from the signals received in a first subset of the first set of symbols, and the second UE 120-2 may perform combined decoding and/or AGC using the signals received in a second subset of the first set of symbols (e.g., using a time-switching architecture, as described elsewhere herein). In some aspects, the second UE 120-2 may harvest energy from a first portion of the available power in the signals received in the first set of symbols, and the second UE 120-2 may use a second portion of the available power in the signals received in the first set of symbols for combined decoding with one or more of the second set of symbols and/or for AGC (e.g., using a power-switching architecture, as described elsewhere herein).

As indicated above, FIG. 5 is provided as an example. Other examples may differ from what is described with respect to FIG. 5.

Figure 6:
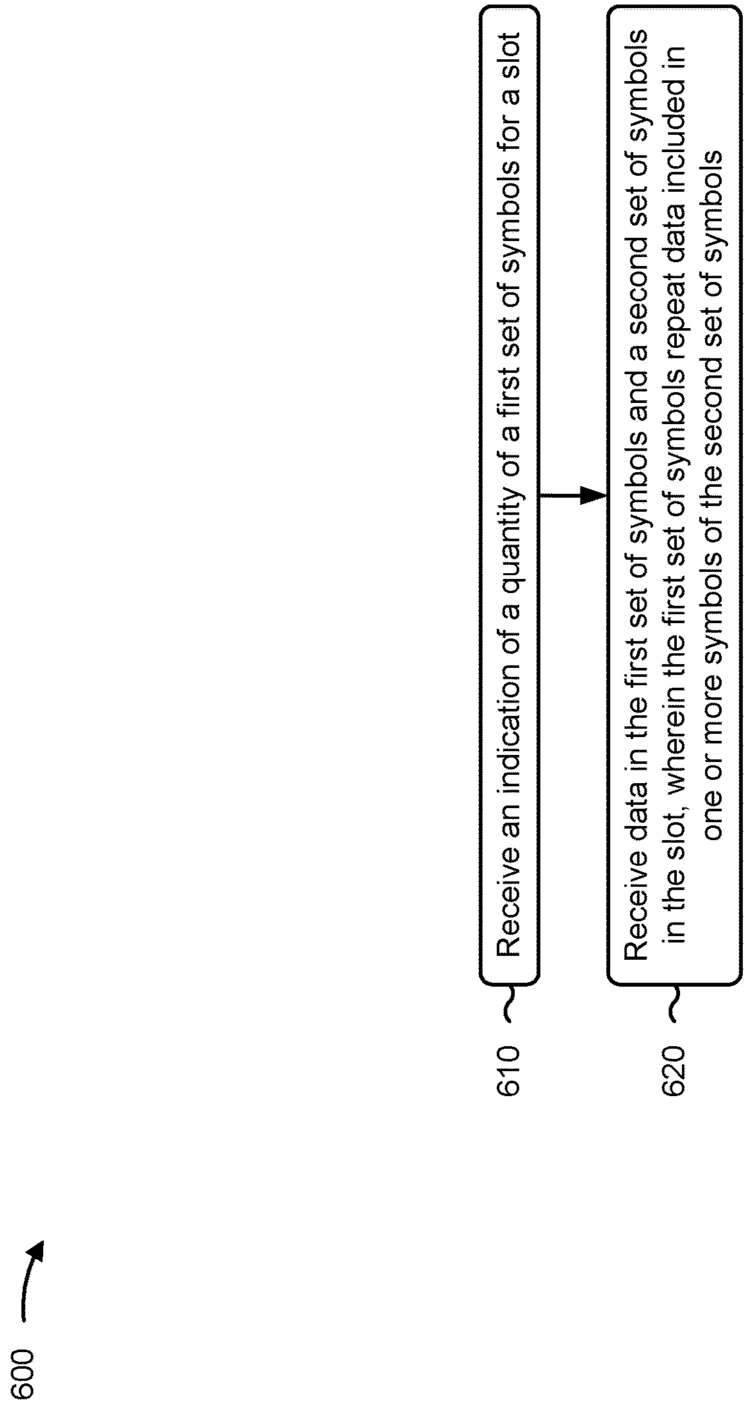
FIGS. 6-8 are diagrams illustrating example processes associated with within slot repetition for improved coverage, energy harvesting, and/or AGC, in accordance with the present disclosure.

FIG. 6 is a diagram illustrating an example process 600 performed, for example, by a UE, in accordance with the present disclosure. Example process 600 is an example where the UE (e.g., UE 120) performs operations associated with within slot repetition for improved coverage, energy harvesting, and/or AGC.

As shown in FIG. 6, in some aspects, process 600 may include receiving an indication of a quantity of a first set of symbols for a slot (block 610). For example, the UE (e.g., using communication manager 140 and/or reception component 902, depicted in FIG. 9) may receive an indication of a quantity of a first set of symbols for a slot, as described above.

As further shown in FIG. 6, in some aspects, process 600 may include receiving data in the first set of symbols and a second set of symbols in the slot, wherein the first set of symbols repeat data included in one or more symbols of the second set of symbols (block 620). For example, the UE (e.g., using communication manager 140 and/or reception component 902, depicted in FIG. 9) may receive data in the first set of symbols and a second set of symbols in the slot, wherein the first set of symbols repeat data included in one or more symbols of the second set of symbols, as described above.

Process 600 may include additional aspects, such as any single aspect or any combination of aspects described below and/or in connection with one or more other processes described elsewhere herein.

In a first aspect, process 600 includes performing radio frequency energy harvesting using the first set of symbols.

In a second aspect, alone or in combination with the first aspect, process 600 includes performing combined decoding of the one or more symbols of the second set of symbols and the first set of symbols.

In a third aspect, alone or in combination with one or more of the first and second aspects, performing combined decoding of the one or more symbols of the second set of symbols and the first set of symbols includes performing combined decoding of the one or more symbols of the second set of symbols and the first set of symbols based at least in part on a determination not to perform energy harvesting.

In a fourth aspect, alone or in combination with one or more of the first through third aspects, process 600 includes performing automatic gain control using at least a portion of the first set of symbols.

In a fifth aspect, alone or in combination with one or more of the first through fourth aspects, performing automatic gain control using the first set of symbols includes performing automatic gain control using the first set of symbols based at least in part on a determination not to perform energy harvesting.

In a sixth aspect, alone or in combination with one or more of the first through fifth aspects, the first set of symbols includes the quantity, indicated by the indication, of first occurring symbols in the slot.

In a seventh aspect, alone or in combination with one or more of the first through sixth aspects, the one or more symbols of the second set of symbols includes the quantity, indicated by the indication, of first occurring symbols in the second set of symbols in the slot.

In an eighth aspect, alone or in combination with one or more of the first through seventh aspects, the indication indicates a repetition pattern for the first set of symbols in the slot.

In a ninth aspect, alone or in combination with one or more of the first through eighth aspects, the repetition pattern indicates the one or more symbols in the second set of symbols for which the data is repeated in the first set of symbols.

In a tenth aspect, alone or in combination with one or more of the first through ninth aspects, process 600 includes performing rate-matching for decoding across the second set of symbols.

In an eleventh aspect, alone or in combination with one or more of the first through tenth aspects, receiving the data includes receiving, from a base station, a downlink communication, the first set of symbols includes a first set of PDSCH symbols in the slot, and the second set of symbols includes a second set of PDSCH symbols in the slot.

In a twelfth aspect, alone or in combination with one or more of the first through eleventh aspects, receiving the indication of the quantity of the first set of symbols for the slot includes receiving, from the base station, the indication of the quantity of the first set of symbols for the slot.

In a thirteenth aspect, alone or in combination with one or more of the first through twelfth aspects, the indication is included in at least one of an RRC message, a MAC-CE, or DCI.

In a fourteenth aspect, alone or in combination with one or more of the first through thirteenth aspects, the indication includes a configuration of a respective zero power channel station information reference signal on each symbol of the first set of symbols.

In a fifteenth aspect, alone or in combination with one or more of the first through fourteenth aspects, process 600 includes transmitting, to the base station, an indication of at least one of a requested quantity of the first set of symbols or a requested repetition pattern for the first set of symbols.

In a sixteenth aspect, alone or in combination with one or more of the first through fifteenth aspects, process 600 includes transmitting, to the base station, an indication of a requested location of the first set of symbols in the slot.

In a seventeenth aspect, alone or in combination with one or more of the first through sixteenth aspects, receiving the data includes receiving, from a transmitting UE, a sidelink communication, the first set of symbols includes a first set of PSSCH symbols, and the second set of symbols includes a second set of PSSCH symbols.

In an eighteenth aspect, alone or in combination with one or more of the first through seventeenth aspects, receiving the indication of the quantity of the first set of symbols for the slot includes receiving, from the transmitting UE, the indication of the quantity of the first set of symbols for the slot.

In a nineteenth aspect, alone or in combination with one or more of the first through eighteenth aspects, the indication indicates a selection of a repetition pattern, from a plurality of configured repetition patterns, for the first set of symbols.

In a twentieth aspect, alone or in combination with one or more of the first through nineteenth aspects, the indication is included in at least one of a RRC message, a PC5 MAC-CE, or SCI.

In a twenty-first aspect, alone or in combination with one or more of the first through twentieth aspects, receiving the quantity of the first set of symbols for the slot includes receiving, from the transmitting UE, the indication of the quantity of the first set of symbols for the slot in another slot that is one or more slots prior to the slot.

In a twenty-second aspect, alone or in combination with one or more of the first through twenty-first aspects, process 600 includes transmitting, to the transmitting UE, an indication of at least one of a requested quantity of the first set of symbols or a requested repetition pattern for the first set of symbols.

In a twenty-third aspect, alone or in combination with one or more of the first through twenty-second aspects, process 600 includes transmitting, to the transmitting UE, an indication of a requested location of the first set of symbols in the slot.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
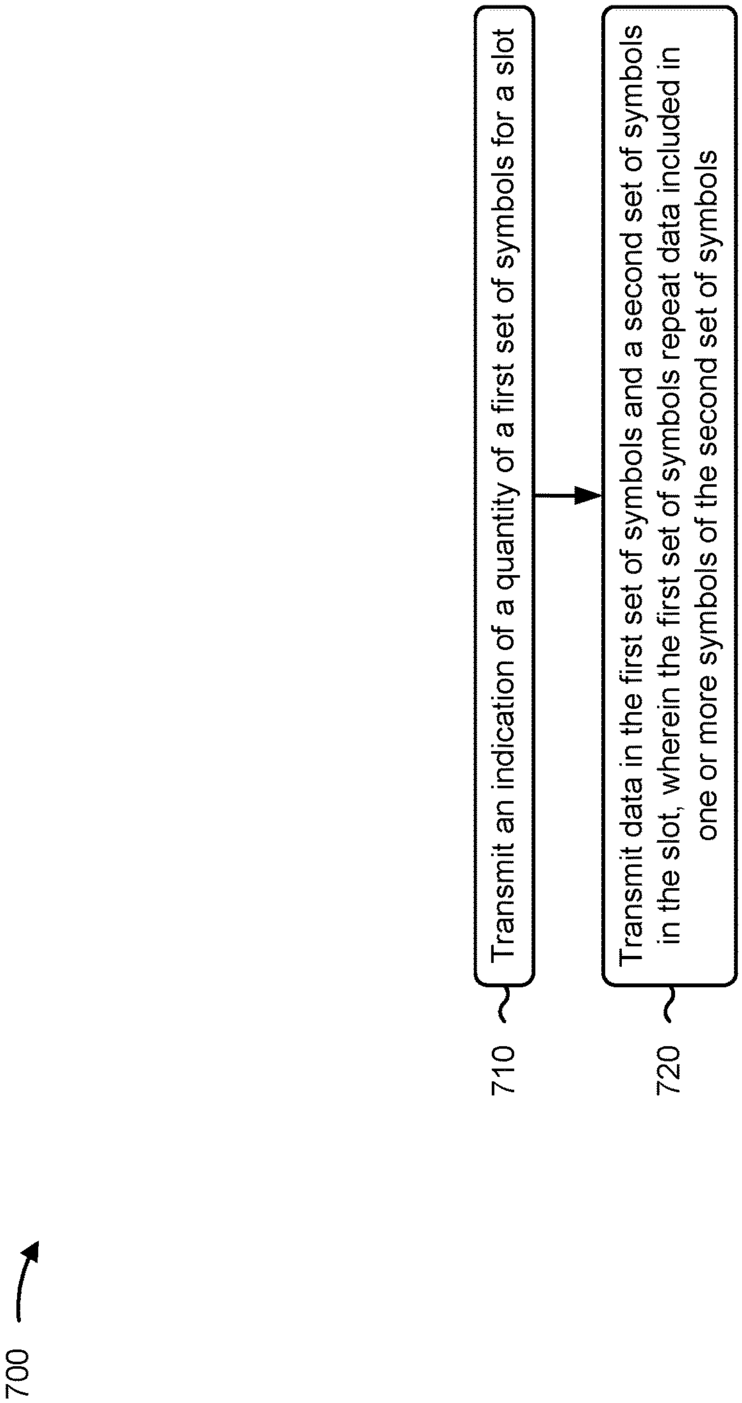

FIG. 7 is a diagram illustrating an example process 700 performed, for example, by a UE (e.g., a first UE), in accordance with the present disclosure. Example process 700 is an example where the UE (e.g., UE 120) performs operations associated with within slot repetition for improved coverage, energy harvesting, and/or AGC.

As shown in FIG. 7, in some aspects, process 700 may include transmitting, to a second UE, an indication of a quantity of a first set of symbols for a slot (block 710). For example, the UE (e.g., using communication manager 140 and/or transmission component 904, depicted in FIG. 9) may transmit, to a second UE, an indication of a quantity of a first set of symbols for a slot, as described above.

As further shown in FIG. 7, in some aspects, process 700 may include transmitting, to the second UE, data in the first set of symbols and a second set of symbols in the slot, wherein the first set of symbols repeat data included in one or more symbols of the second set of symbols (block 720). For example, the UE (e.g., using communication manager 140 and/or transmission component 904, depicted in FIG. 9) may transmit, to the second UE, data in the first set of symbols and a second set of symbols in the slot, wherein the first set of symbols repeat data included in one or more symbols of the second set of symbols, as described above.

Process 700 may include additional aspects, such as any single aspect or any combination of aspects described below and/or in connection with one or more other processes described elsewhere herein.

In a first aspect, transmitting the data includes transmitting, to the second UE, a sidelink communication, the first set of symbols includes a first set of PSSCH symbols, and the second set of symbols includes a second set of PSSCH symbols.

In a second aspect, alone or in combination with the first aspect, the indication indicates a repetition pattern for the first set of symbols in the slot.

In a third aspect, alone or in combination with one or more of the first and second aspects, the repetition pattern indicates the one or more symbols in the second set of symbols for which the data is repeated in the first set of symbols.

In a fourth aspect, alone or in combination with one or more of the first through third aspects, the indication indicates a selected repetition pattern, from a plurality of configured repetition patterns, for the first set of symbols.

In a fifth aspect, alone or in combination with one or more of the first through fourth aspects, the indication is included in at least one of a PC5 RRC message, a PC5 MAC-CE, or SCI.

In a sixth aspect, alone or in combination with one or more of the first through fifth aspects, transmitting the indication of the quantity of the first set of symbols for the slot includes transmitting, to the second UE, the indication of the quantity of the first set of symbols for the slot in another slot that is one or more slots prior to the slot.

In a seventh aspect, alone or in combination with one or more of the first through sixth aspects, process 700 includes receiving, from the second UE, an indication of at least one of a requested quantity of the first set of symbols or a requested repetition pattern for the first set of symbols.

In an eighth aspect, alone or in combination with one or more of the first through seventh aspects, process 700 includes receiving, from the second UE, an indication of a requested location of the first set of symbols in the slot.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
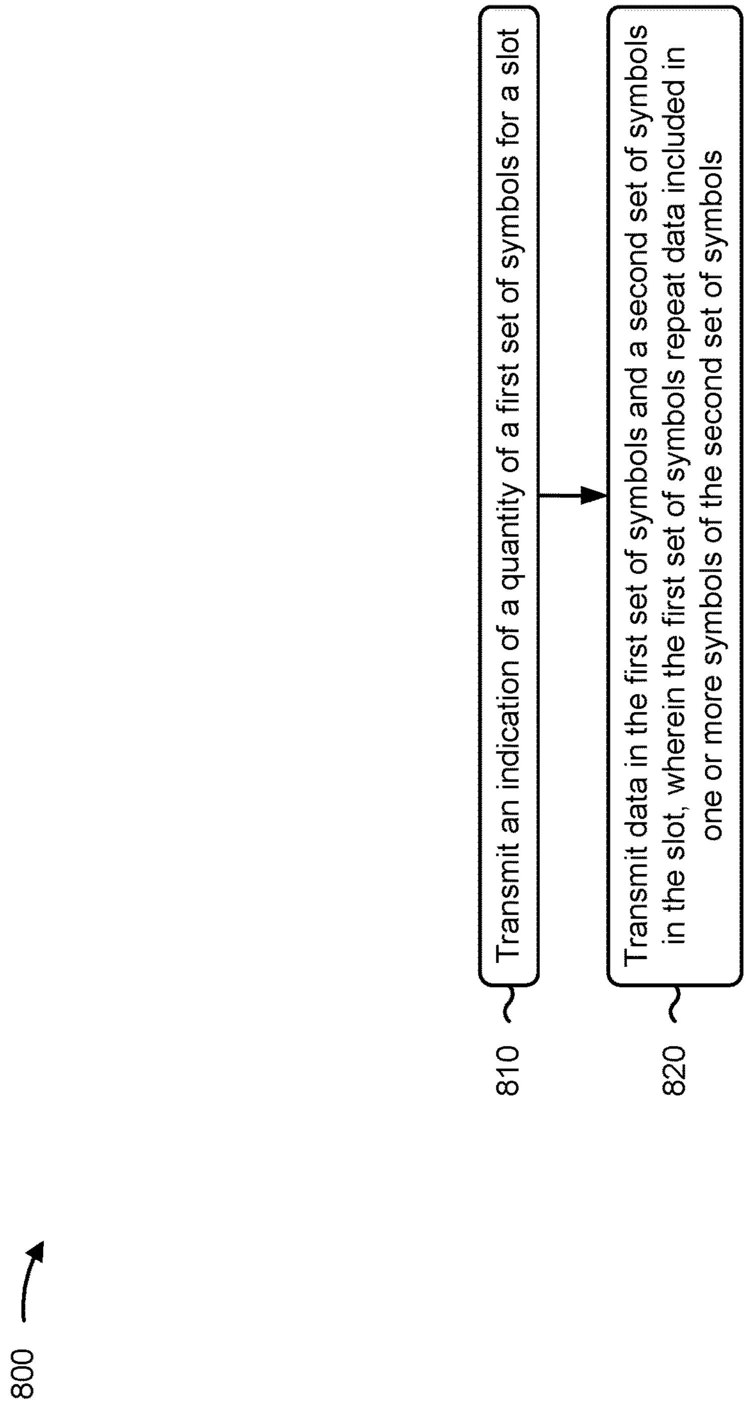

FIG. 8 is a diagram illustrating an example process 800 performed, for example, by a base station, in accordance with the present disclosure. Example process 800 is an example where the base station (e.g., base station 110) performs operations associated with within slot repetition for improved coverage, energy harvesting, and/or AGC.

As shown in FIG. 8, in some aspects, process 800 may include transmitting, to a UE, an indication of a quantity of a first set of symbols for a slot (block 810). For example, the base station (e.g., using communication manager 150 and/or transmission component 1004, depicted in FIG. 10) may transmit, to a UE, an indication of a quantity of a first set of symbols for a slot, as described above.

As further shown in FIG. 8, in some aspects, process 800 may include transmitting, to the UE, data in the first set of symbols and a second set of symbols in the slot, wherein the first set of symbols repeat data included in one or more symbols of the second set of symbols (block 820). For example, the base station (e.g., using communication manager 150 and/or transmission component 1004, depicted in FIG. 10) may transmit, to the UE, data in the first set of symbols and a second set of symbols in the slot, wherein the first set of symbols repeat data included in one or more symbols of the second set of symbols, as described above.

Process 800 may include additional aspects, such as any single aspect or any combination of aspects described below and/or in connection with one or more other processes described elsewhere herein.

In a first aspect, the first set of symbols includes the quantity, indicated by the indication, of first occurring symbols in the slot.

In a second aspect, alone or in combination with the first aspect, the one or more symbols of the second set of symbols includes the quantity, indicated by the indication, of first occurring symbols in the second set of symbols in the slot.

In a third aspect, alone or in combination with one or more of the first and second aspects, the indication indicates a repetition pattern for the first set of symbols in the slot.

In a fourth aspect, alone or in combination with one or more of the first through third aspects, the repetition pattern indicates the one or more symbols in the second set of symbols for which the data is repeated in the first set of symbols.

In a fifth aspect, alone or in combination with one or more of the first through fourth aspects, transmitting the data includes transmitting, to the UE, a downlink communication, the first set of symbols includes a first set of PDSCH symbols in the slot, and the second set of symbols includes a second set of PDSCH symbols in the slot.

In a sixth aspect, alone or in combination with one or more of the first through fifth aspects, the indication is included in at least one of an RRC message, a MAC-CE, or DCI.

In a seventh aspect, alone or in combination with one or more of the first through sixth aspects, the indication includes a configuration of a respective zero power channel station information reference signal on each symbol of the first set of symbols.

In an eighth aspect, alone or in combination with one or more of the first through seventh aspects, process 800 includes receiving, from the UE, an indication of at least one of a requested quantity of the first set of symbols or a requested repetition pattern for the first set of symbols.

In a ninth aspect, alone or in combination with one or more of the first through eighth aspects, process 800 includes receiving, from the UE, an indication of a requested location of the first set of symbols in the slot.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
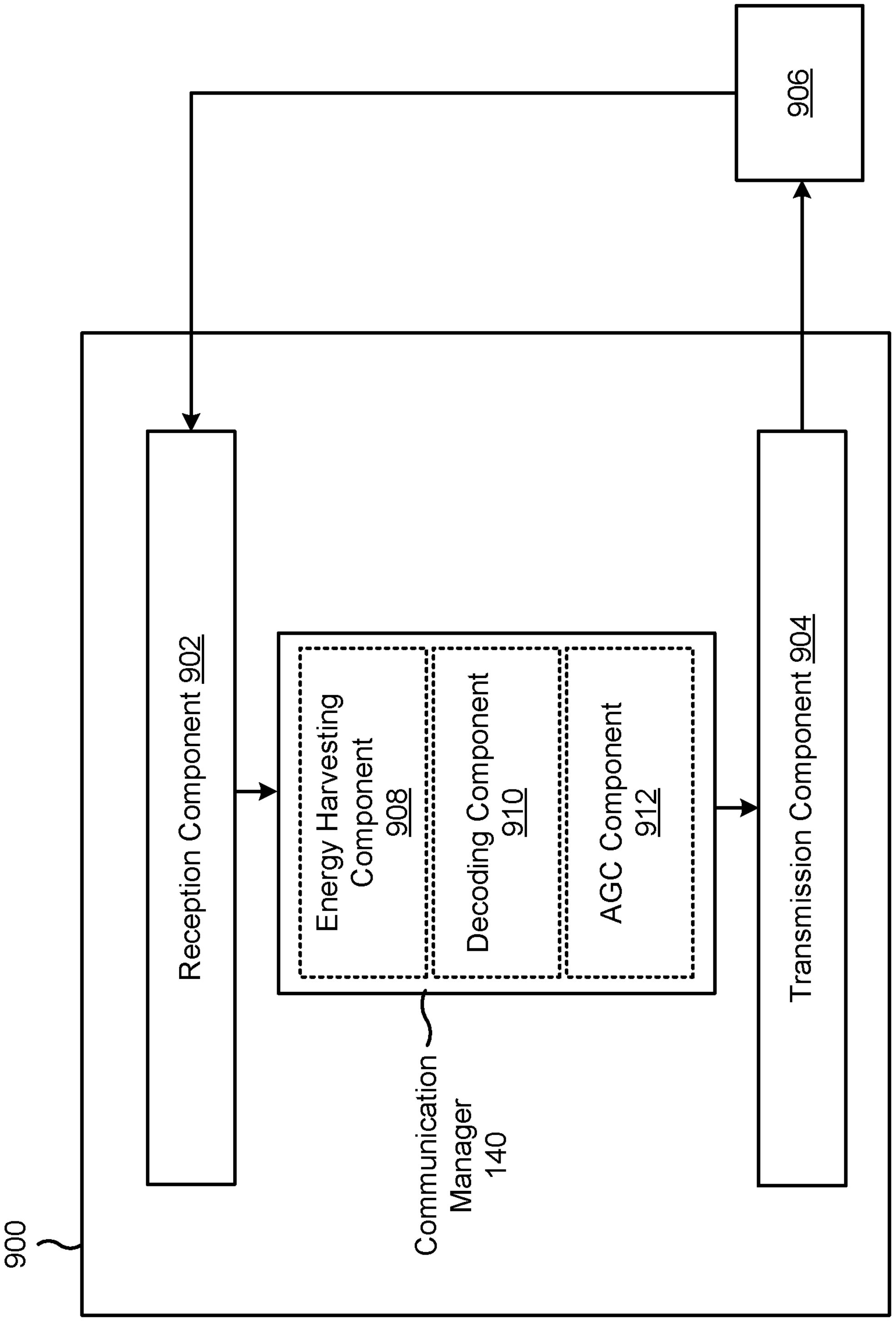
FIGS. 9-10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of an energy harvesting component 908, a decoding component 910, or an AGC component 912, among other examples.

In some aspects, the apparatus 900 may be configured to perform one or more operations described herein in connection with FIGS. 4-5. Additionally, or alternatively, the apparatus 900 may be configured to perform one or more processes described herein, such as process 600 of FIG. 6, process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive an indication of a quantity of a first set of symbols for a slot. The reception component 902 may receive data in the first set of symbols and a second set of symbols in the slot, wherein the first set of symbols repeat data included in one or more symbols of the second set of symbols.

The energy harvesting component 908 may perform radio frequency energy harvesting using the first set of symbols.

The decoding component 910 may perform combined decoding of the one or more symbols of the second set of symbols and the first set of symbols.

The AGC component 912 may perform AGC using at least a portion of the first set of symbols.

The reception component 902 may perform rate-matching for decoding across the second set of symbols.

The transmission component 904 may transmit, to the base station, an indication of at least one of a requested quantity of the first set of symbols or a requested repetition pattern for the first set of symbols.

The transmission component 904 may transmit, to the base station, an indication of a requested location of the first set of symbols in the slot.

The transmission component 904 may transmit, to the transmitting UE, an indication of at least one of a requested quantity of the first set of symbols or a requested repetition pattern for the first set of symbols.

The transmission component 904 may transmit, to the transmitting UE, an indication of a requested location of the first set of symbols in the slot.

The transmission component 904 may transmit, to a second UE, an indication of a quantity of a first set of symbols for a slot. The transmission component 904 may transmit, to the second UE, data in the first set of symbols and a second set of symbols in the slot, wherein the first set of symbols repeat data included in one or more symbols of the second set of symbols.

The reception component 902 may receive, from the second UE, an indication of at least one of a requested quantity of the first set of symbols or a requested repetition pattern for the first set of symbols.

The reception component 902 may receive, from the second UE, an indication of a requested location of the first set of symbols in the slot.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
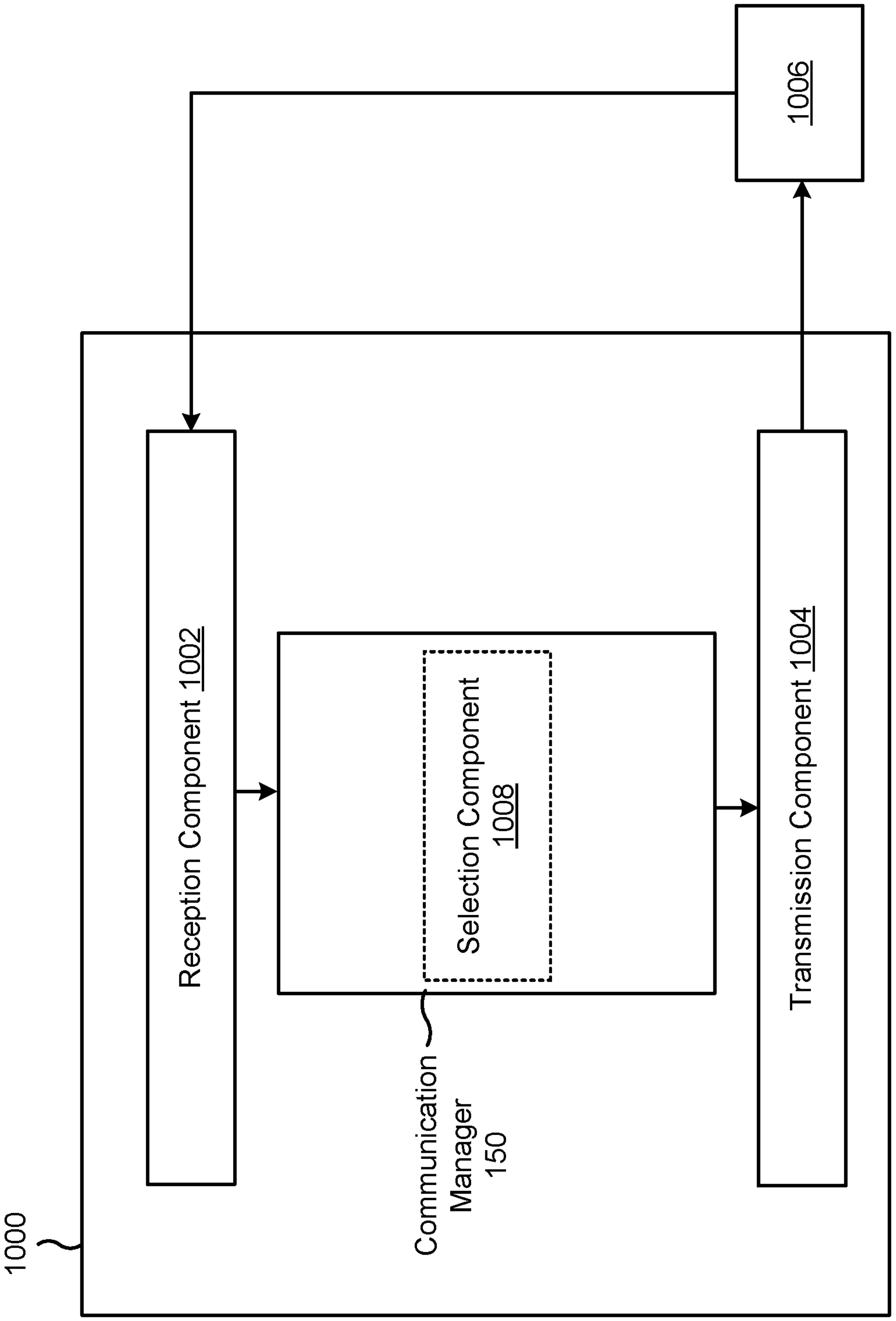

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a selection component 1008.

In some aspects, the apparatus 1000 may be configured to perform one or more operations described herein in connection with FIGS. 4-5. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The transmission component 1004 may transmit, to a UE, an indication of a quantity of a first set of symbols for a slot. The transmission component 1004 may transmit, to the UE, data in the first set of symbols and a second set of symbols in the slot, wherein the first set of symbols repeat data included in one or more symbols of the second set of symbols.

The selection component 1008 may select the quantity of the first set of symbols for the slot and/or a repetition pattern for the first set of symbols.

The reception component 1002 may receive, from the UE, an indication of at least one of a requested quantity of the first set of symbols or a requested repetition pattern for the first set of symbols.

The reception component 1002 may receive, from the UE, an indication of a requested location of the first set of symbols in the slot.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving an indication of a quantity of a first set of symbols for a slot; and receiving data in the first set of symbols and a second set of symbols in the slot, wherein the first set of symbols repeat data included in one or more symbols of the second set of symbols.

Aspect 2: The method of Aspect 1, further comprising: performing radio frequency energy harvesting using the first set of symbols.

Aspect 3: The method of any of Aspects 1-2, further comprising: performing combined decoding of the one or more symbols of the second set of symbols and the first set of symbols.

Aspect 4: The method of Aspect 3, wherein performing combined decoding of the one or more symbols of the second set of symbols and the first set of symbols comprises: performing combined decoding of the one or more symbols of the second set of symbols and the first set of symbols based at least in part on a determination not to perform energy harvesting.

Aspect 5: The method of any of Aspects 1-4, further comprising: performing automatic gain control using at least a portion of the first set of symbols.

Aspect 6: The method of Aspect 5, wherein performing automatic gain control using the first set of symbols comprises: performing automatic gain control using the first set of symbols based at least in part on a determination not to perform energy harvesting.

Aspect 7: The method of any of Aspects 1-6, wherein the first set of symbols includes the quantity, indicated by the indication, of first occurring symbols in the slot.

Aspect 8: The method of Aspect 7, wherein the one or more symbols of the second set of symbols includes the quantity, indicated by the indication, of first occurring symbols in the second set of symbols in the slot.

Aspect 9: The method of any of Aspects 1-8, wherein the indication indicates a repetition pattern for the first set of symbols in the slot.

Aspect 10: The method of Aspect 9, wherein the repetition pattern indicates the one or more symbols in the second set of symbols for which the data is repeated in the first set of symbols.

Aspect 11: The method of any of Aspects 1-10, further comprising: performing rate-matching for decoding across the second set of symbols.

Aspect 12: The method of any of Aspects 1-11, wherein receiving the data comprises: receiving, from a base station, a downlink communication, wherein the first set of symbols includes a first set of physical downlink shared channel (PDSCH) symbols in the slot, and wherein the second set of symbols includes a second set of PDSCH symbols in the slot.

Aspect 13: The method of Aspect 12, wherein receiving the indication of the quantity of the first set of symbols for the slot comprises: receiving, from the base station, the indication of the quantity of the first set of symbols for the slot.

Aspect 14: The method of Aspect 13, wherein the indication is included in at least one of a radio resource control (RRC) message, a medium access control (MAC) control element (MAC-CE), or downlink control information (DCI).

Aspect 15: The method of any of Aspects 13-14, wherein the indication includes a configuration of a respective zero power channel station information reference signal on each symbol of the first set of symbols.

Aspect 16: The method of any of Aspects 13-15, further comprising: transmitting, to the base station, an indication of at least one of a requested quantity of the first set of symbols or a requested repetition pattern for the first set of symbols.

Aspect 17: The method of any of Aspects 13-16, further comprising: transmitting, to the base station, an indication of a requested location of the first set of symbols in the slot.

Aspect 18: The method of any of Aspects 1-11, wherein receiving the data comprises: receiving, from a transmitting UE, a sidelink communication, wherein the first set of symbols includes a first set of physical sidelink shared channel (PSSCH) symbols, and wherein the second set of symbols includes a second set of PSSCH symbols.

Aspect 19: The method of Aspect 18, wherein receiving the indication of the quantity of the first set of symbols for the slot comprises: receiving, from the transmitting UE, the indication of the quantity of the first set of symbols for the slot.

Aspect 20: The method of Aspect 19, wherein the indication indicates a selection of a repetition pattern, from a plurality of configured repetition patterns, for the first set of symbols.

Aspect 21: The method of any of Aspects 19-20, wherein the indication is included in at least one of a PC5 radio resource control (RRC) message, a PC5 medium access control (MAC) control element (MAC-CE), or sidelink control information (SCI).

Aspect 22: The method of any of Aspects 19-21, wherein receiving the quantity of the first set of symbols for the slot comprises: receiving, from the transmitting UE, the indication of the quantity of the first set of symbols for the slot in another slot that is one or more slots prior to the slot.

Aspect 23: The method of any of Aspects 19-22, further comprising: transmitting, to the transmitting UE, an indication of at least one of a requested quantity of the first set of symbols or a requested repetition pattern for the first set of symbols.

Aspect 24: The method of any of Aspects 19-23, further comprising: transmitting, to the transmitting UE, an indication of a requested location of the first set of symbols in the slot.

Aspect 25: A method of wireless communication performed by a first user equipment (UE), comprising: transmitting, to a second UE, an indication of a quantity of a first set of symbols for a slot; and transmitting, to the second UE, data in the first set of symbols and a second set of symbols in the slot, wherein the first set of symbols repeat data included in one or more symbols of the second set of symbols.

Aspect 26: The method of Aspect 25, wherein transmitting the data comprises: transmitting, to the second UE, a sidelink communication, wherein the first set of symbols includes a first set of physical sidelink shared channel (PSSCH) symbols, and wherein the second set of symbols includes a second set of PSSCH symbols.

Aspect 27: The method of Aspect 26, wherein the indication indicates a repetition pattern for the first set of symbols in the slot.

Aspect 28: The method of Aspect 27, wherein the repetition pattern indicates the one or more symbols in the second set of symbols for which the data is repeated in the first set of symbols.

Aspect 29: The method of Aspect 27, wherein the indication indicates a selected repetition pattern, from a plurality of configured repetition patterns, for the first set of symbols.

Aspect 30: The method of any of Aspects 26-29, wherein the indication is included in at least one of a PC5 radio resource control (RRC) message, a PC5 medium access control (MAC) control element (MAC-CE), or sidelink control information (SCI).

Aspect 31: The method of any of Aspects 25-30, wherein transmitting the indication of the quantity of the first set of symbols for the slot comprises: transmitting, to the second UE, the indication of the quantity of the first set of symbols for the slot in another slot that is one or more slots prior to the slot.

Aspect 32: The method of any of Aspects 25-31, further comprising: receiving, from the second UE, an indication of at least one of a requested quantity of the first set of symbols or a requested repetition pattern for the first set of symbols.

Aspect 33: The method of any of Aspects 25-32, further comprising: receiving, from the second UE, an indication of a requested location of the first set of symbols in the slot.

Aspect 34: A method of wireless communication performed by a base station, comprising: transmitting, to a user equipment (UE), an indication of a quantity of a first set of symbols for a slot; and transmitting, to the UE, data in the first set of symbols and a second set of symbols in the slot, wherein the first set of symbols repeat data included in one or more symbols of the second set of symbols.

Aspect 35: The method of Aspect 34, wherein the first set of symbols includes the quantity, indicated by the indication, of first occurring symbols in the slot.

Aspect 36: The method of Aspect 35, wherein the one or more symbols of the second set of symbols includes the quantity, indicated by the indication, of first occurring symbols in the second set of symbols in the slot.

Aspect 37: The method of any of Aspects 34-35, wherein the indication indicates a repetition pattern for the first set of symbols in the slot.

Aspect 38: The method of Aspect 37, wherein the repetition pattern indicates the one or more symbols in the second set of symbols for which the data is repeated in the first set of symbols.

Aspect 39: The method of any of Aspects 34-38, wherein transmitting the data comprises: transmitting, to the UE, a downlink communication, wherein the first set of symbols includes a first set of physical downlink shared channel (PDSCH) symbols in the slot, and wherein the second set of symbols includes a second set of PDSCH symbols in the slot.

Aspect 40: The method of Aspect 39, wherein the indication is included in at least one of a radio resource control (RRC) message, a medium access control (MAC) control element (MAC-CE), or downlink control information (DCI).

Aspect 41: The method of any of Aspects 39-40, wherein the indication includes a configuration of a respective zero power channel station information reference signal on each symbol of the first set of symbols.

Aspect 42: The method of any of Aspects 34-41, further comprising: receiving, from the UE, an indication of at least one of a requested quantity of the first set of symbols or a requested repetition pattern for the first set of symbols.

Aspect 43: The method of any of Aspects 34-42, further comprising: receiving, from the UE, an indication of a requested location of the first set of symbols in the slot.

Aspect 44: An apparatus for wireless communication at a device, comprising a processor; memory coupled with the processor; and instructions stored in the memory and executable by the processor to cause the apparatus to perform the method of one or more of Aspects 1-24.

Aspect 45: A device for wireless communication, comprising a memory and one or more processors coupled to the memory, the one or more processors configured to perform the method of one or more of Aspects 1-24.

Aspect 46: An apparatus for wireless communication, comprising at least one means for performing the method of one or more of Aspects 1-24.

Aspect 47: A non-transitory computer-readable medium storing code for wireless communication, the code comprising instructions executable by a processor to perform the method of one or more of Aspects 1-24.

Aspect 48: A non-transitory computer-readable medium storing a set of instructions for wireless communication, the set of instructions comprising one or more instructions that, when executed by one or more processors of a device, cause the device to perform the method of one or more of Aspects 1-24.

Aspect 49: An apparatus for wireless communication at a device, comprising a processor; memory coupled with the processor; and instructions stored in the memory and executable by the processor to cause the apparatus to perform the method of one or more of Aspects 25-33.

Aspect 50: A device for wireless communication, comprising a memory and one or more processors coupled to the memory, the one or more processors configured to perform the method of one or more of Aspects 25-33.

Aspect 51: An apparatus for wireless communication, comprising at least one means for performing the method of one or more of Aspects 25-33.

Aspect 52: A non-transitory computer-readable medium storing code for wireless communication, the code comprising instructions executable by a processor to perform the method of one or more of Aspects 25-33.

Aspect 53: A non-transitory computer-readable medium storing a set of instructions for wireless communication, the set of instructions comprising one or more instructions that, when executed by one or more processors of a device, cause the device to perform the method of one or more of Aspects 25-33.

Aspect 54: An apparatus for wireless communication at a device, comprising a processor; memory coupled with the processor; and instructions stored in the memory and executable by the processor to cause the apparatus to perform the method of one or more of Aspects 34-43.

Aspect 55: A device for wireless communication, comprising a memory and one or more processors coupled to the memory, the one or more processors configured to perform the method of one or more of Aspects 34-43.

Aspect 56: An apparatus for wireless communication, comprising at least one means for performing the method of one or more of Aspects 34-43.

Aspect 57: A non-transitory computer-readable medium storing code for wireless communication, the code comprising instructions executable by a processor to perform the method of one or more of Aspects 34-43.

Aspect 58: A non-transitory computer-readable medium storing a set of instructions for wireless communication, the set of instructions comprising one or more instructions that, when executed by one or more processors of a device, cause the device to perform the method of one or more of Aspects 34-43.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term “component” is intended to be broadly construed as hardware and/or a combination of hardware and software. “Software” shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a “processor” is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to:

receive an indication of a quantity of a first set of symbols for a slot;

receive data in the first set of symbols and a second set of symbols in the slot, wherein the first set of symbols repeat data included in one or more symbols of the second set of symbols; and perform combined decoding of the one or more symbols of the second set of symbols and the first set of symbols based at least in part on a determination not to perform energy harvesting.

2. The UE of claim 1, wherein the one or more processors are further configured to:

perform automatic gain control using at least a portion of the first set of symbols.

3. The UE of claim 2, wherein the one or more processors, to perform automatic gain control using the first set of symbols, are configured to:

perform automatic gain control using the first set of symbols based at least in part on the determination not to perform energy harvesting.

4. The UE of claim 1, wherein the first set of symbols includes the quantity, indicated by the indication, of first occurring symbols in the slot.

5. The UE of claim 4, wherein the one or more symbols of the second set of symbols includes the quantity, indicated by the indication, of first occurring symbols in the second set of symbols in the slot.

6. The UE of claim 1, wherein the indication indicates a repetition pattern for the first set of symbols in the slot.

7. The UE of claim 6, wherein the repetition pattern indicates the one or more symbols in the second set of symbols for which the data is repeated in the first set of symbols.

8. The UE of claim 1, wherein the one or more processors are further configured to:

perform rate-matching for decoding across the second set of symbols.

9. The UE of claim 1, wherein the one or more processors, to receive the data, are configured to:

receive, from a base station, a downlink communication, wherein the first set of symbols includes a first set of physical downlink shared channel (PDSCH) symbols in the slot, and wherein the second set of symbols includes a second set of PDSCH symbols in the slot.

10. The UE of claim 9, wherein the one or more processors, to receive the indication of the quantity of the first set of symbols for the slot, are configured to:

receive, from the base station, the indication of the quantity of the first set of symbols for the slot.

11. The UE of claim 10, wherein the indication is included in at least one of a radio resource control (RRC) message, a medium access control (MAC) control element (MAC-CE), or downlink control information (DCI).

12. The UE of claim 10, wherein the indication includes a configuration of a respective zero power channel station information reference signal on each symbol of the first set of symbols.

13. The UE of claim 10, wherein the one or more processors are further configured to:

transmit, to the base station, an indication of at least one of a requested quantity of the first set of symbols or a requested repetition pattern for the first set of symbols.

14. The UE of claim 10, wherein the one or more processors are further configured to:

transmit, to the base station, an indication of a requested location of the first set of symbols in the slot.

15. The UE of claim 1, wherein the one or more processors, to receive the data, are configured to:

receive, from a transmitting UE, a sidelink communication, wherein the first set of symbols includes a first set of physical sidelink shared channel (PSSCH) symbols, and wherein the second set of symbols includes a second set of PSSCH symbols.

16. The UE of claim 15, wherein the one or more processors, to receive the indication of the quantity of the first set of symbols for the slot, are configured to:

receive, from the transmitting UE, the indication of the quantity of the first set of symbols for the slot.

17. The UE of claim 16, wherein the indication indicates a selection of a repetition pattern, from a plurality of configured repetition patterns, for the first set of symbols.

18. The UE of claim 16, wherein the indication is included in at least one of a PC5 radio resource control (RRC)

message, a PC5 medium access control (MAC) control element (MAC-CE), or sidelink control information (SCI).

19. The UE of claim 16, wherein the one or more processors, to receive the quantity of the first set of symbols for the slot, are configured to:

receive, from the transmitting UE, the indication of the quantity of the first set of symbols for the slot in another slot that is one or more slots prior to the slot.

20. The UE of claim 16, wherein the one or more processors are further configured to:

transmit, to the transmitting UE, an indication of at least one of a requested quantity of the first set of symbols or a requested repetition pattern for the first set of symbols.

21. The UE of claim 16, wherein the one or more processors are further configured to:

transmit, to the transmitting UE, an indication of a requested location of the first set of symbols in the slot.

22. A method of wireless communication performed by a user equipment (UE), comprising:

receiving an indication of a quantity of a first set of symbols for a slot;

receiving data in the first set of symbols and a second set of symbols in the slot, wherein the first set of symbols repeat data included in one or more symbols of the second set of symbols; and performing combined decoding of the one or more symbols of the second set of symbols and the first set of symbols based at least in part on a determination not to perform energy harvesting.

23. The method of claim 22, further comprising at least one of:

performing automatic gain control using at least a portion of the first set of symbols.

24. The method of claim 22, wherein receiving the data comprises:

receiving, from a base station, a downlink communication, wherein the first set of symbols includes a first set of physical downlink shared channel (PDSCH) symbols in the slot, and wherein the second set of symbols includes a second set of PDSCH symbols in the slot.

25. The method of claim 22, wherein receiving the data comprises:

receiving, from a transmitting UE, a sidelink communication, wherein the first set of symbols includes a first set of physical sidelink shared channel (PSSCH) symbols, and wherein the second set of symbols includes a second set of PSSCH symbols.

26. A non-transitory computer-readable medium storing a set of instructions for wireless communication, the set of instructions comprising:

one or more instructions that, when executed by one or more processors of a user equipment (UE), cause the UE to:

receive an indication of a quantity of a first set of symbols for a slot;

receive data in the first set of symbols and a second set of symbols in the slot, wherein the first set of symbols repeat data included in one or more symbols of the second set of symbols; and perform combined decoding of the one or more symbols of the second set of symbols and the first set of symbols based at least in part on a determination not to perform energy harvesting.

27. An apparatus for wireless communication, comprising:

means for receiving an indication of a quantity of a first set of symbols for a slot;

means for receiving data in the first set of symbols and a second set of symbols in the slot, wherein the first set of symbols repeat data included in one or more symbols of the second set of symbols; and means for performing combined decoding of the one or more symbols of the second set of symbols and the first set of symbols based at least in part on a determination not to perform energy harvesting.

* * * * *